США010743527B2

(12) United States Patent
Mancini

(10) Patent No.: US 10,743,527 B2
(45) Date of Patent: *Aug. 18, 2020

(54) FISHING LURE SYSTEM AND KIT HAVING REPLACEABLE FEATURES AND CONSTRUCTION

(71) Applicant: Future of Fishing, Inc., Stamford, CT (US)

(72) Inventor: Jeffrey J. Mancini, Stamford, CT (US)

(73) Assignee: FUTURE OF FISHING, INC., Stamford, CT (US)

( * ) Notice: Subject to any disclaimer, the term of this patent is extended or adjusted under 35 U.S.C. 154(b) by 102 days.

This patent is subject to a terminal disclaimer.

(21) Appl. No.: 16/019,651

(22) Filed: Jun. 27, 2018

(65) Prior Publication Data

US 2018/0310539 A1 Nov. 1, 2018

Related U.S. Application Data

(63) Continuation of application No. 15/615,170, filed on Jun. 6, 2017, now Pat. No. 10,028,493, which is a continuation of application No. 14/628,240, filed on Feb. 21, 2015, now Pat. No. 9,668,464, which is a continuation-in-part of application No. 13/916,211, filed on Jun. 12, 2013, now Pat. No. 9,095,128, which (Continued)

(51) Int. Cl.
| A01K 85/01 | (2006.01) |
| A01K 85/18 | (2006.01) |
| A01K 85/00 | (2006.01) |
| A01K 85/16 | (2006.01) |
| A01K 85/02 | (2006.01) |

(52) U.S. Cl.
CPC .............. *A01K 85/18* (2013.01); *A01K 85/00* (2013.01); *A01K 85/01* (2013.01); *A01K 85/02* (2013.01); *A01K 85/16* (2013.01)

(58) Field of Classification Search
CPC ......... A01K 85/01; A01K 85/18; A01K 85/00
USPC ...................... 43/42.09, 42.06, 42.26, 42.31
See application file for complete search history.

(56) References Cited

U.S. PATENT DOCUMENTS

| 3,490,165 A | 1/1970 | Thomassin |
| 3,863,378 A | 2/1975 | Walker |

(Continued)

FOREIGN PATENT DOCUMENTS

| CA | 2290903 | 5/2001 |
| JP | 11-196714 | 7/1999 |
| WO | WO 2005/115137 | 12/2005 |

OTHER PUBLICATIONS

PCT/US08/61827, International Search Report and Written Opinion, dated Sep. 30, 2008, 13 pages—English.

*Primary Examiner* — Christopher P Ellis
(74) *Attorney, Agent, or Firm* — Andrew F. Young, Esq.; Lackenbach Siegel, LLP

(57) ABSTRACT

Adaptable fishing lure kits, systems, and devices are provided. An adaptable fishing lure system may include a fishing lure body having a generally cylindrical shape, a fin member replaceably attachable to the fishing lure body, via a slot formed within an outer periphery surface of the lure body, and a channel chamber longitudinally extending through and within at least a portion of a length of the fishing lure body. The slot providing access to the channel, at least one cartridge providing an attractant into the chamber formed within the fishing lure body. Alternative use of an adhesive and means for securing a fin member and attractant are provided.

5 Claims, 24 Drawing Sheets

Related U.S. Application Data is a continuation of application No. 12/525,979, filed as application No. PCT/US2008/061827 on Apr. 28, 2008, now Pat. No. 8,490,319.

(60) Provisional application No. 60/914,223, filed on Apr. 26, 2007, provisional application No. 60/914,230, filed on Apr. 26, 2007, provisional application No. 60/914,220, filed on Apr. 26, 2007.

(56) References Cited

U.S. PATENT DOCUMENTS

| | | |
|---|---|---|
| 3,967,406 A | 7/1976 | Anderson |
| 3,973,350 A | 8/1976 | England |
| 4,380,132 A | 4/1983 | Atkinson |
| 4,453,335 A | 6/1984 | Smith |
| 4,610,103 A | 9/1986 | Steinman |
| 4,638,584 A | 1/1987 | Lindsay |
| 4,672,768 A | 6/1987 | Pippert |
| 4,693,032 A | 9/1987 | Mattison |
| 4,709,499 A | 12/1987 | Ottaviano |
| 4,785,569 A | 11/1988 | Thomas, Jr. |
| 4,791,749 A | 12/1988 | Stazo |
| 4,823,497 A | 4/1989 | Pierce |
| 4,831,765 A | 5/1989 | Bradshaw |
| 5,038,512 A | 8/1991 | Rudolph |
| 5,119,581 A | 6/1992 | Rudolph |
| 5,193,299 A | 3/1993 | Correll et al. |
| 5,331,762 A | 7/1994 | Banks |
| 5,355,613 A | 10/1994 | Kechriotis |
| 5,517,781 A | 5/1996 | Paoletta et al. |
| 5,537,770 A | 7/1996 | Storm et al. |
| 5,566,494 A | 10/1996 | Zimmer |
| 5,661,921 A | 9/1997 | Mason |
| 5,678,349 A | 10/1997 | Pacora |
| 5,678,350 A | 10/1997 | Moore |
| 5,806,234 A | 9/1998 | Nichols |
| 5,862,623 A | 1/1999 | MacPherson |
| 5,894,693 A | 4/1999 | Davie |
| 5,953,849 A | 9/1999 | Boucher, Jr. |
| 6,041,540 A | 3/2000 | Potts |
| 6,182,391 B1 | 2/2001 | Hubbard |
| 6,219,955 B1 | 4/2001 | Hnizdor |
| 6,266,916 B1 | 7/2001 | Dugan |
| 6,301,823 B1 | 10/2001 | Monticello et al. |
| 6,393,755 B1 | 5/2002 | Weaver |
| 6,510,646 B1 | 1/2003 | Kechriotis |
| 6,643,975 B1 | 11/2003 | Edwards |
| 6,718,684 B2 | 4/2004 | Yong-Set |
| 6,807,766 B1 | 10/2004 | Hughes et al. |
| 6,857,220 B2 | 2/2005 | King |
| 6,912,808 B1 | 7/2005 | Mak |
| 6,922,937 B1 | 8/2005 | Gilbert |
| 6,941,696 B2 | 9/2005 | Kato |
| 7,080,476 B2 | 7/2006 | King |
| 7,104,004 B1 | 9/2006 | Renosky |
| 7,174,669 B1 | 2/2007 | Kallas |
| 7,185,457 B2 | 3/2007 | Nichols |
| 7,263,798 B2 | 9/2007 | Nichols |
| 2001/0047609 A1 | 12/2001 | Orgeron et al. |
| 2002/0007582 A1 | 1/2002 | Coppola, Jr. |
| 2002/0043016 A1 | 4/2002 | Kechriotis |
| 2002/0178643 A1 | 12/2002 | Brodeur |
| 2002/0189150 A1 | 12/2002 | Thorne |
| 2002/0194770 A1 | 12/2002 | King |
| 2003/0024150 A1 | 2/2003 | Hawkins |
| 2003/0110678 A1 | 6/2003 | Yong-Set |
| 2003/0192227 A1 | 10/2003 | Stava, III et al. |
| 2004/0025406 A1 | 2/2004 | Kato |
| 2005/0126066 A1 | 6/2005 | King |
| 2005/0172536 A1 | 8/2005 | King |
| 2005/0204607 A1 | 9/2005 | Nichols |
| 2005/0246941 A1 | 11/2005 | Mitchell et al. |
| 2005/0252069 A1 | 11/2005 | Pool et al. |
| 2006/0053679 A1 | 3/2006 | Milanese |
| 2006/0143972 A1 | 7/2006 | Nichols |
| 2006/0174535 A1 | 8/2006 | Beer et al. |
| 2006/0236588 A1 | 10/2006 | Rapelje |
| 2006/0260176 A1 | 11/2006 | Yeung |
| 2006/0260177 A1 | 11/2006 | Thomas |
| 2007/0062094 A1 | 3/2007 | Senter |
| 2007/0119090 A1 | 5/2007 | Searcy |
| 2007/0163165 A1 | 7/2007 | Castro et al. |
| 2007/0175083 A1 | 8/2007 | Wilson et al. |

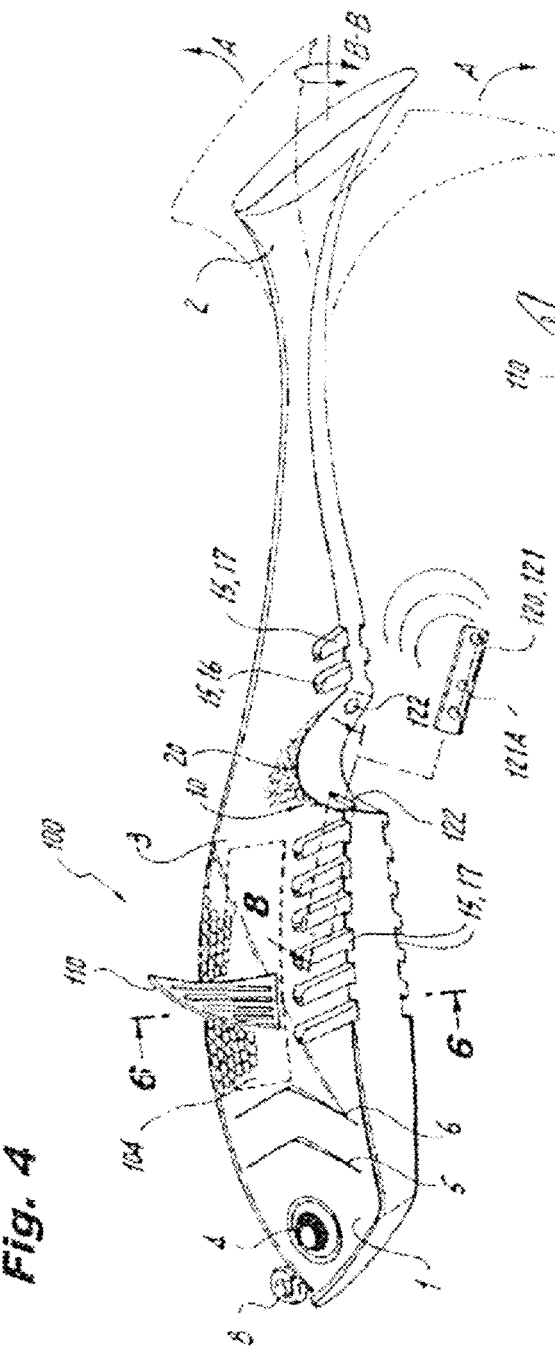
Fig. 4
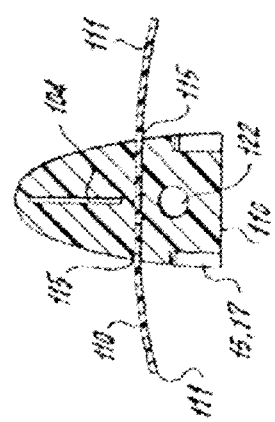
Fig. 5
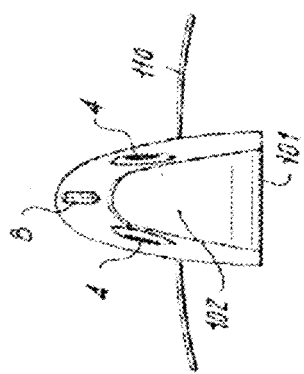
Fig. 6
Fig. 7

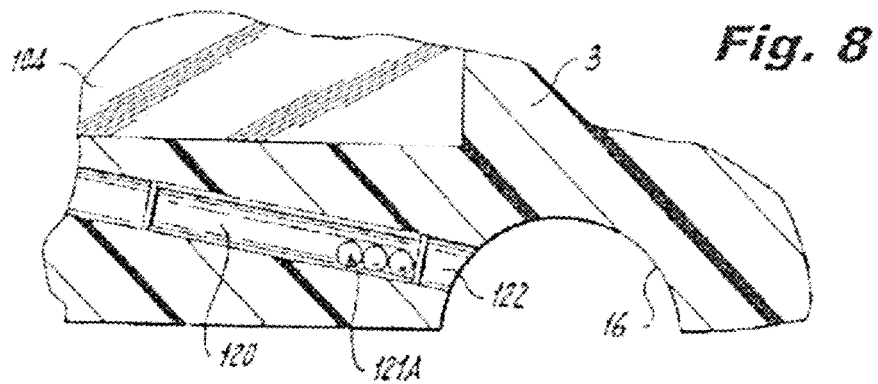
Fig. 8
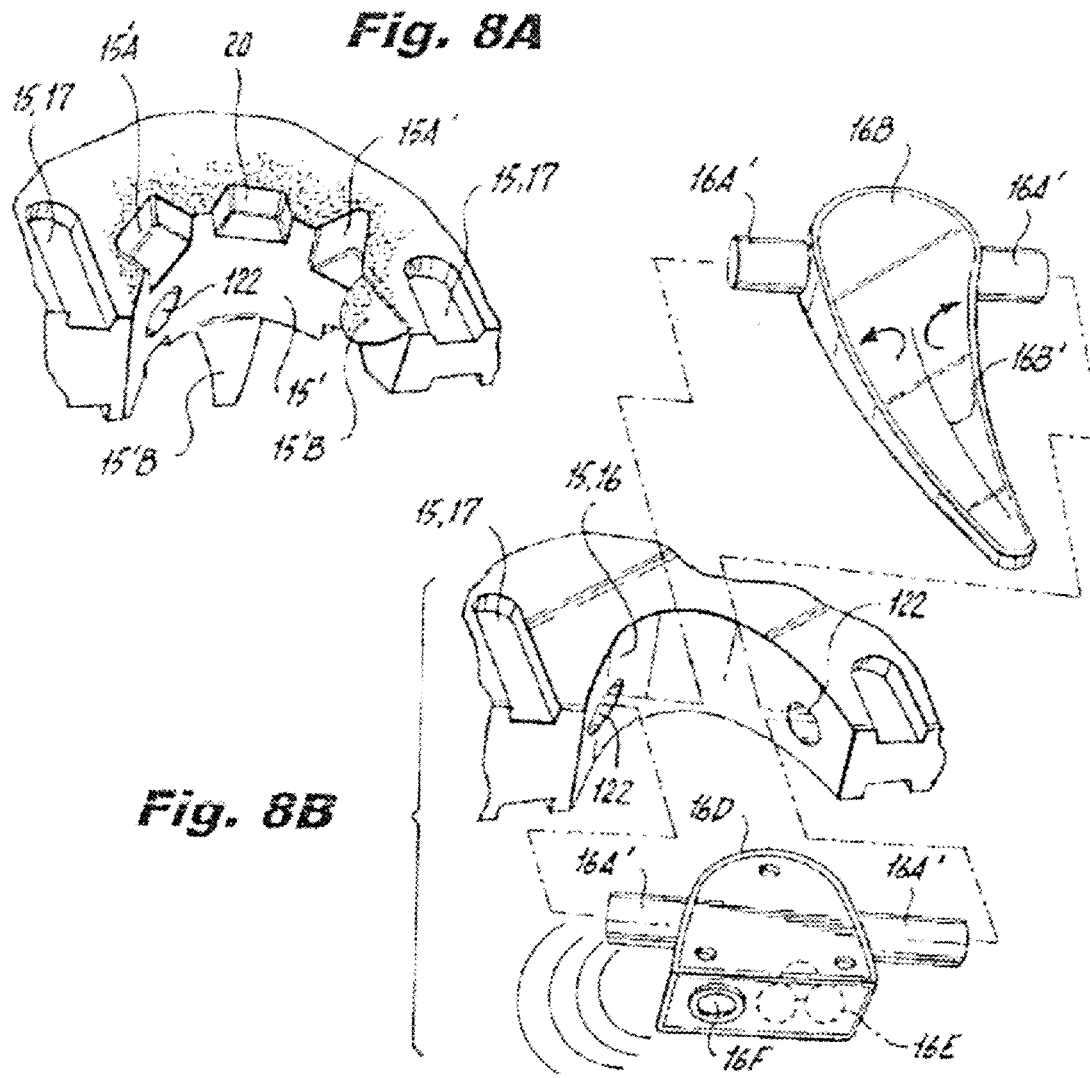
Fig. 8A
Fig. 8B

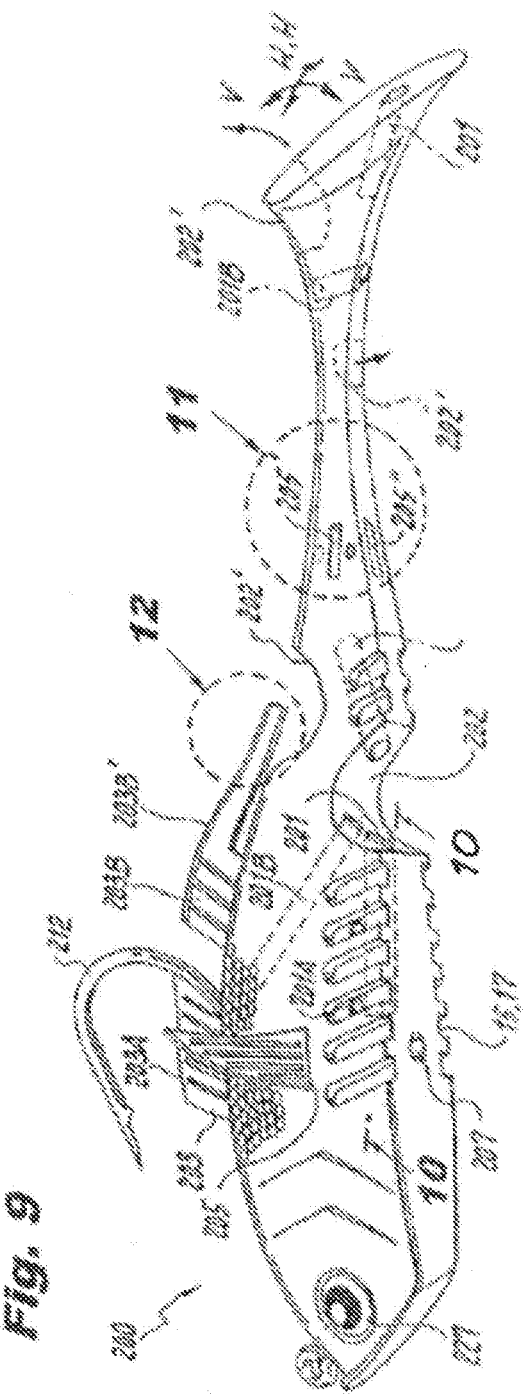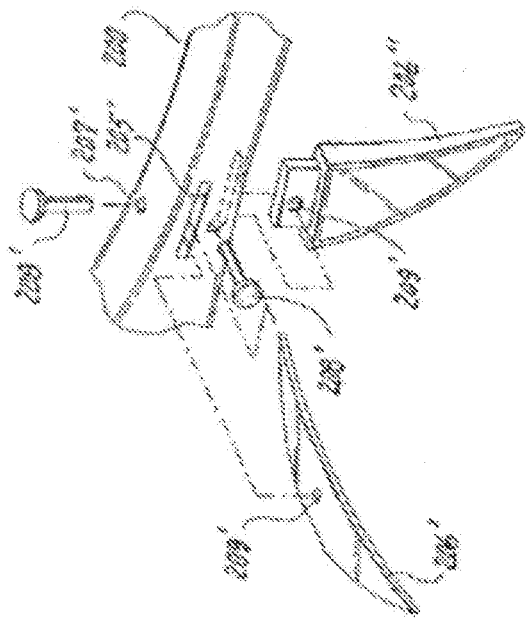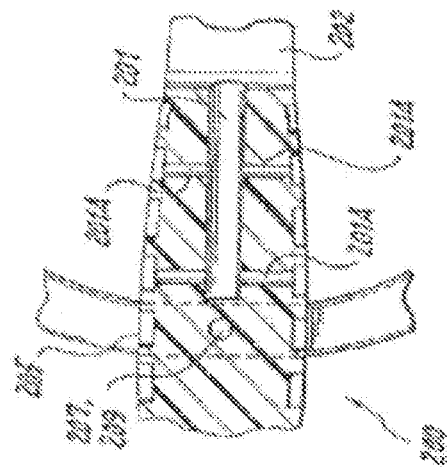

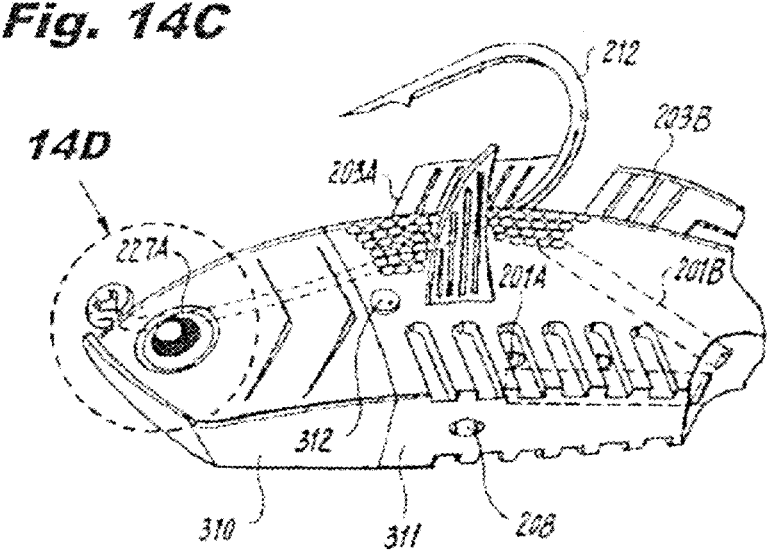
Fig. 14C
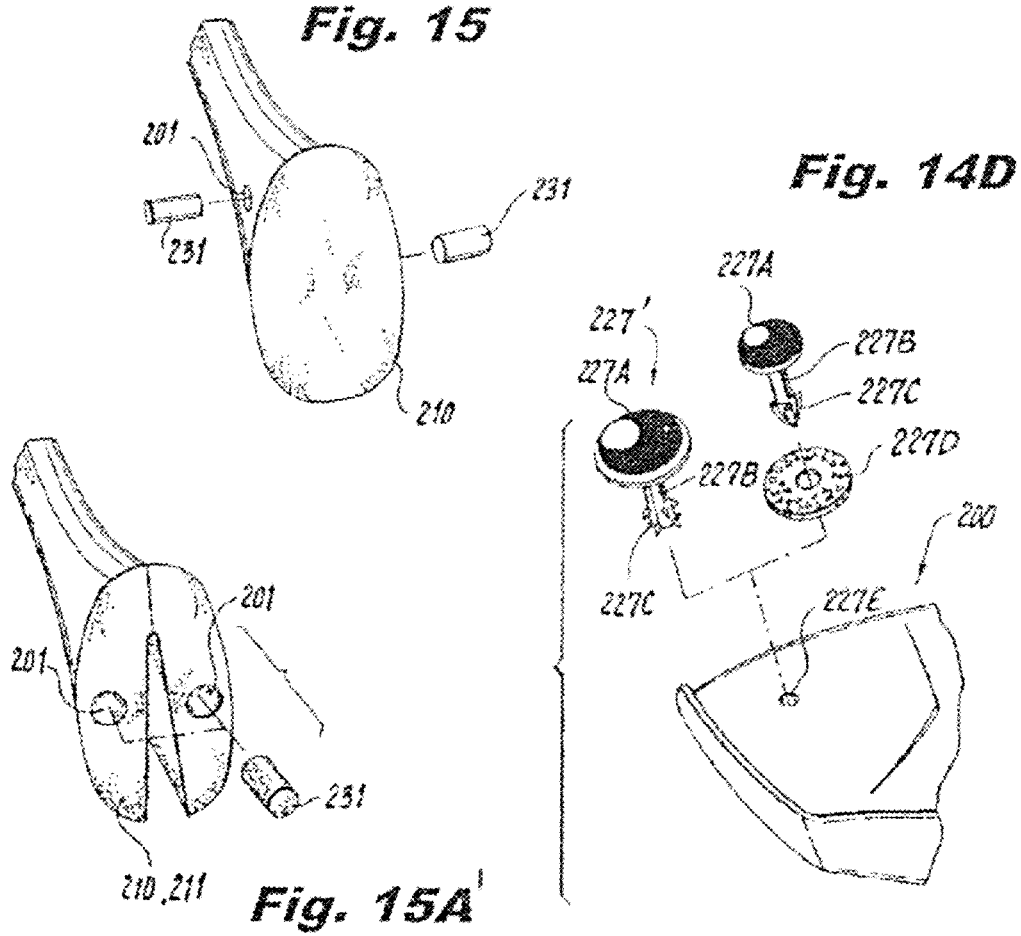
Fig. 15
Fig. 14D
Fig. 15A

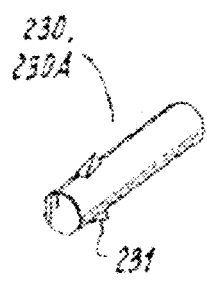 Fig. 15B
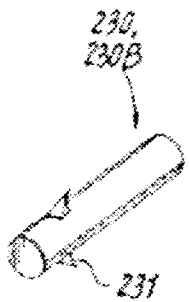 Fig. 15C
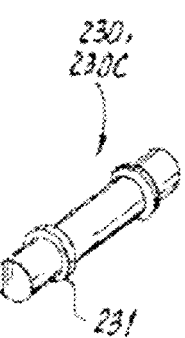 Fig. 15D
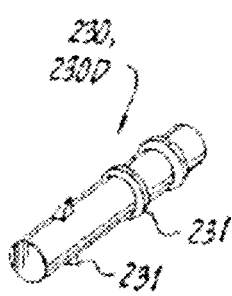 Fig. 15E

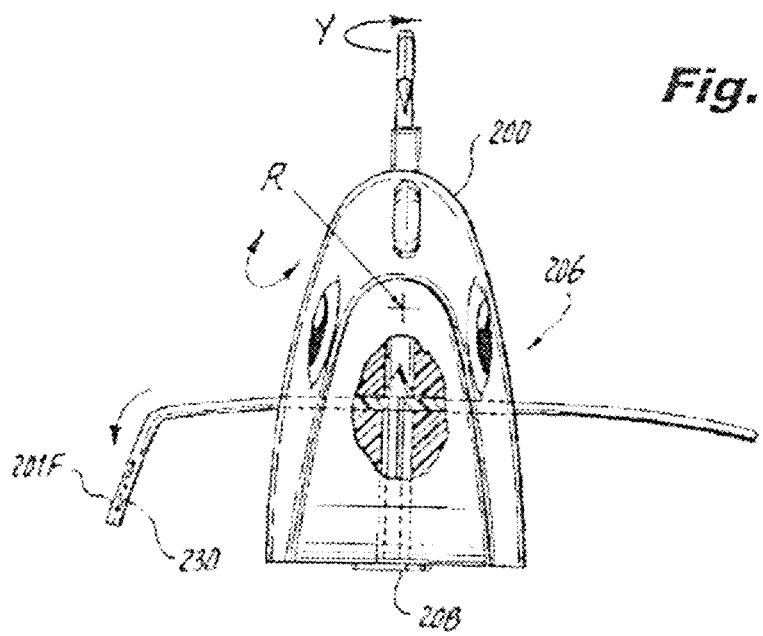
Fig. 18I
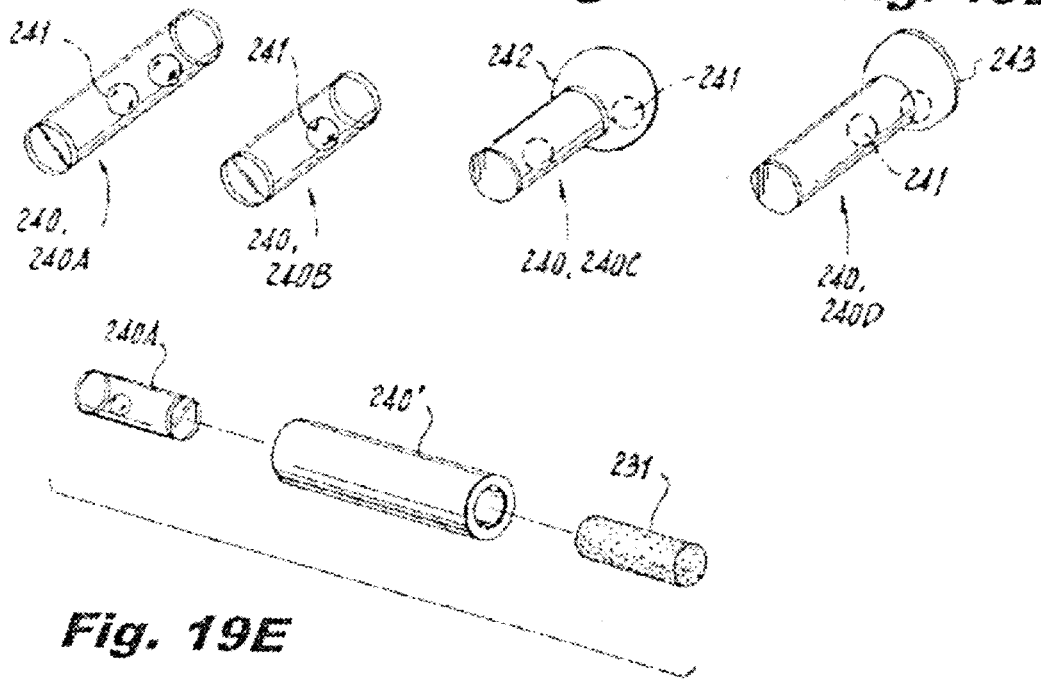
Fig 19A  Fig 19B  Fig. 19C  Fig. 19D
Fig. 19E

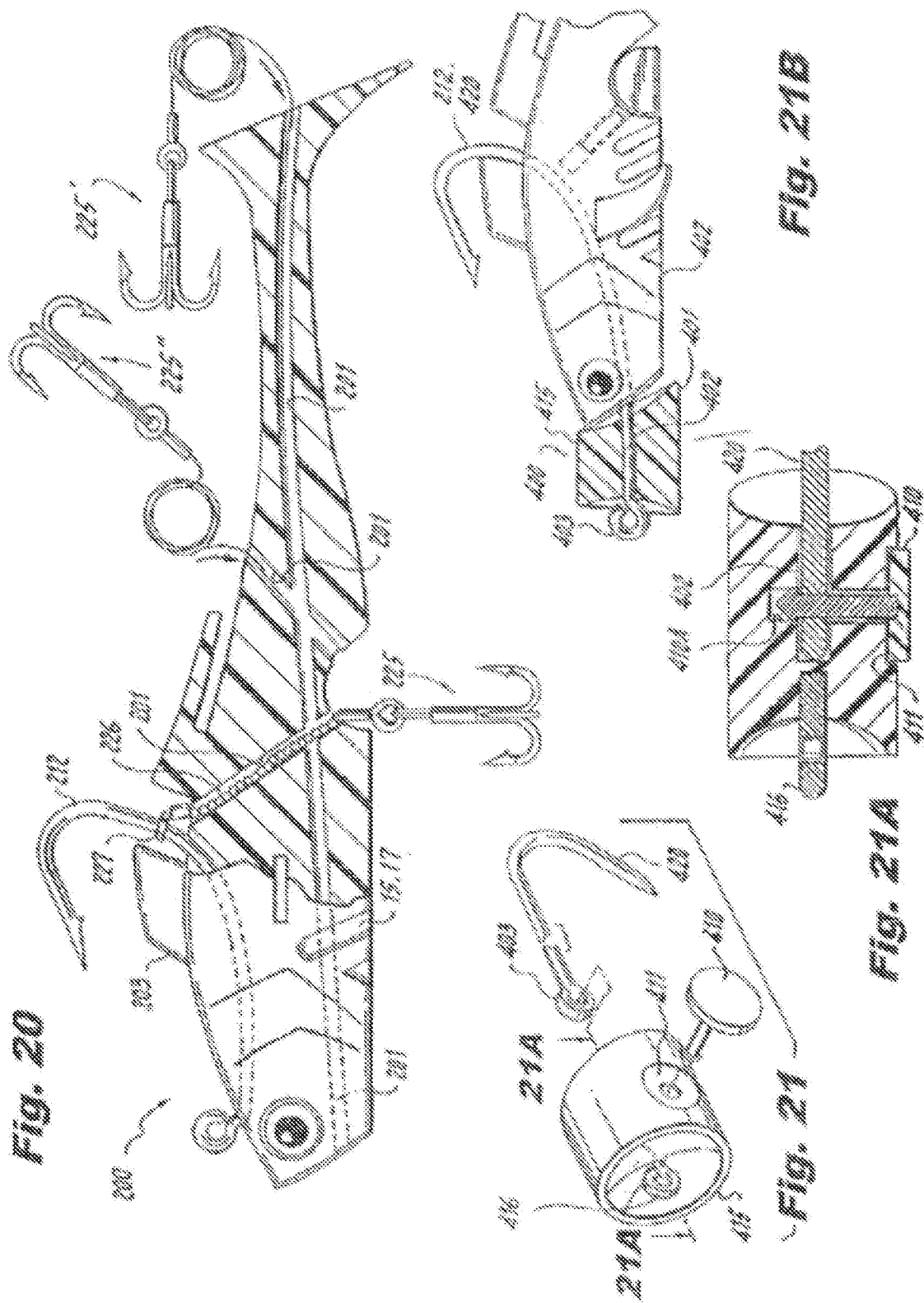

FISHING LURE SYSTEM AND KIT HAVING REPLACEABLE FEATURES AND CONSTRUCTION

CROSS REFERENCE TO RELATED APPLICATIONS

This application is a continuation of U.S. Ser. No. 15/615,170 filed Jun. 6, 2017 (allowable) which is a continuation of U.S. Ser. No. 14/628,240 filed Feb. 21, 201 now U.S. Pat. No. 9,668,464 issued Jun. 6, 2017; which is a continuation-in-part of U.S. Ser. No. 13/916,211 filed Jun. 12, 2013 now U.S. Pat. No. 9,095,128 issued Aug. 4, 2015; which is a continuation of U.S. Ser. No. 12/525,979 filed Oct. 1, 2010 now U.S. Pat. No. 8,490,319 on Jul. 23, 2013, which is a § 371 national phase of and claims priority from PCT/US2008/061827 filed Apr. 28, 2008-which claims priority from U.S. Ser. No. 60/914,230 filed Apr. 26, 2007, U.S. Ser. No. 60/914,220 filed Apr. 26, 2007 and U.S. Ser. No. 60/914,223 filed Apr. 26, 2007, the entire contents of each of which is incorporated herein by reference.

FIGURE SELECTED FOR PUBLICATION

FIG. 38.

BACKGROUND

1. Technical Field

The present invention relates to fishing lures. More specifically, the present invention relates to a fishing lure system and kit having optional replaceable features, improved fish-attracting construction, and adaptive lure engagement means.

2. Background of Related Art

The related art involves a plurality of fishing lures and fishing lure adaptations, each focused on particular goals as identified in respective reference. As clearly noted in the related art, each adaptation is available for its own specific purpose and not another. The focus of each adaptation is specific for the particular purpose stated.

Fishing lures have heretofore consisted of familiar, expected and obvious structural configurations to mimic healthy bait with the required physical operation of the lures by fisherman.

In U.S. Pat. No. 6,182,391 to Hubbard, the contents of which are incorporated fully by reference, a plurality of flexible lures are constructed from plastisol via injection molding or other techniques known to those of skill in the lure-manufacturing arts.

Hubbard, additionally discloses the inclusion of reflective foil, embossed foil, polyester, embossed film, metalized film, embossed metalized film, holographic foil film, and holographic metalized film, within the body or on the surface of a soft flexible lure, whereas previously such coatings or reflective materials had operated as surface coatings or films. Hubbard also discusses previously recognized lure manufacturing techniques and constructions, and limits the discussion to a preferred method for including such reflective foils or films within a lure.

Finally, the related art, in Hubbard '391 and others as noted below, discuss a plurality of alternative lure construction shapes, with differing tails, differing bodies, differing shapes, and sizes all mimicking or attempting to mimic the actions of healthy prey bait for fish. These differing shapes and sizes include representations of shapes other than fish, such as crayfish, birds, amphibians, etc. but all such shapes are incorporated herein by reference and all mimic healthy prey.

In U.S. Pat. No. 4,831,765 to Bradshaw, a simplified disclosure is provided wherein a holographic image of a fish or other living creature such as a grasshopper, or any portion of a natural environment such as grass, including (for the fish) its eye is formed on the body of the lure. Optionally a light source is provided to illuminate a holographic image of the lure. A brief discussion of the complex multiplexing process for producing holographic images is discussed to describe how a life-like representation of a desirable healthy living animal may be produced on a two-dimensional image. These discussions are also incorporated fully by reference.

Additional references are discussed below, each incorporated by reference in their entirety.

In U.S. 2006/020176 to Yeung, a lure apparatus and system are provided where reinforced flexible segments are provided in an effort to simulate swimming in a life-like manner while being retrieved or trolled. A method of manufacturing a sports fishing lure involving a film is discussed and a number of differing lure shapes are discussed.

Also incorporated by reference are U.S. App. No. 2006/0236588 to Rapelje, which addresses a number of alternative lure designs, and U.S. App. No. 2006/0174535 to Beer et al., which provides a form of rattle-type fishing tackle rattle mechanism involving a rolling or rattling ball within a capsule that is fixed in the lure. The contents of each of which are incorporated herein by reference.

In U.S. App. No. 2005/0252069 to Pool et al, an electronic flashing fishing lure is provided wherein a sensor triggers the lure's operation in an effort to trigger fish response to a health prey-bait fish.

Referring now to FIGS. 1 and 2 noted in U.S. 2002/0189150 to Thorne, the entire contents of which are incorporated herein by reference, a castable fishing lure 1000 has a segmented body joining a plurality of rigid body members 1001 via a rigid wire pivot ring assembly 1002 to attempts to provide a simulation of a healthy life-form swimming action noted at arrows 1003A, 1003B. A number of hooks 1004 are affixed and a fishing line 1005 is rigidly mounted to the front rigid body member 1001A. Due to the unpredictable nature of the hooks 1004 swinging, motion of the fishing pole pulling lure 1000, variable tension on line 1005 and other factors the tail segment member 1001B is caused to make an undesirable rubbing or scrapping-sound when contacting the surfaces of the head segment member 1001A along the inner channel 1006 containing the pivot ring assembly 1002.

Referring now to FIG. 3, noted in U.S. 2001/0047609 to Orgeron, the entire contents of which are incorporated herein by reference, a bobber-suspended lure system 1010 includes a bobber member 1011 and a live shrimp shaped lure 1012. A separate line 1013 is slidably connected to a hook 1014 fixed into the body of lure 1012 and includes a portion 1013A that exits the body of lure 1012 before connecting with the hook 1014. As discussed in Orgeron, the line portion 1013A increases or decreases depending upon the movement 1015 of bobber 1011 floating on a wave-motion surface (not shown). In this way the hook 1014 is drawn forward bending lure 1012 to create a shrimp-back-ward-swimming motion to mimic the live healthy action of a fresh shrimp. An unfortunate detriment to this construction is that it requires line member 1013A to slide into and out of lure 1012 every fraction of a second or so depending upon wave action or fishing-pole action by a user (approximately one to five movements per second), and this friction on line 1013A causes it to fray and break rapidly, causes damage to lure 1012, and ultimate loss of lure 1012.

In U.S. App. 2002/0178643 to Brodeur, a fishing lure includes a particularly selected curved shape to aid "action" during retrieval to mimic a live healthy bait-prey fish. The entire content of this reference is also incorporated by reference.

In U.S. Pat. No. 5,517,781 to Paoletta et al., a scent dispensing worm lure includes a fluid reservoir for holding scented fluid and the worm body is constructed from a resilient material such that a fish bite will compress the fluid reservoir causing the dispensing thereof.

In U.S. Pat. No. 6,807,766 to Hughes et al, it is suggested to provide a lure body having a casement for receiving an electronic insert. The insert is operated by a microcontroller programmed to implement at least one sequence of operation implemented by at least one of a LED light emitter, a vibration-producing device and an audio transducer. An electrical power supply in the insert provides power to the devices and microcontroller, and a pair of externally exposed contacts switches the microcontroller ON when bridged by water containing electrolytes, as would be found in a fishing area. Hughes also suggests that this external fluid switch also produces an electrical field around the lure, this electrical field also serving to simulate healthy living food creatures to entice fish to bite the lure. The entire contents of this reference are incorporated by reference herein.

In U.S. Pat. No. 6,922,937 to Gilbert, the entire contents of which are incorporated by reference, a fishing lure consisting of an arched hollow body with an interior bait chamber is provided. The interior chamber is divided into a buoyancy chamber and a bait chamber. A number of small openings are formed in the outer body to enable scent and bait particles to be broadcast from bait stored within the bait chamber as the hire is passed through the water. Access to the bait chamber is further provided by either a hinged cover or by a hinged connection formed in the lure body between the buoyancy chamber and the bait chamber. Once removed from the water, access to the bait chamber is readily obtained through movement of either the cover or the hinged lure body for re-supplying bait prior to supplemental use of the lure.

In U.S. Pat. No. 7,174,669 to Kallas, the entire contents of which are incorporated by reference, a lure includes an internal hollow cavity having a plurality of scent releasing apertures that produce a powerful scent trail that attracts game fish in a manner particular to the design of Kallas.

In U.S. Pat. No. 5,678,349 to Pacora, the entire contents of which are incorporated herein by reference, a clear pivoting member is pivotally attached to the upper side of a base member of a lure at its forward end so that it pivots and swings upward from the lower body base to mimic a live and healthy prey fish. When the pivoting member is swung upward, a removable insert of varying colors and appearances and of corresponding shape can be placed within the cavity of the pivoting member, and the upper body is then pivoted downward and snap-fit to the lower body base. The removable insert is thus held within the cavity of the pivoting member. A fisherman can change the color, appearance or shape of an artificial fishing lure by replacing one artificial fishing lure plug with another in an attempt to replicate a healthy and fish-attractive prey fish.

The contents of U.S. App. 2001/0047609 to Orgeron et al, U.S. Pat. No. 7,104,004 to Renosky, U.S. Pat. No. 6,643,975 to Edwards, U.S. Pat. No. 6,301,823 to Monticello et al., U.S. App. Pub. 2006/0053679 to Milaneso, and U.S. Pat. No. 5,806,234 to Nichols, are also entirely incorporated herein by reference to provide additional understanding to the reader. The entire contents of each patent or publication referenced hereinabove is also fully incorporated herein by reference.

What is not appreciated by the related art is however, the need for a fish lure system having a replaceable fin members and a plurality of fish-attention capturing features operable as a kit in combination with a recognition that game fish are predators that recognize the traits of a wounded bait fish. Despite extensive efforts in the field no prior efforts have focused on intentionally representing a damaged or wounded bait animal that is less then healthy.

What is also not appreciated by the related art is need for a lure kit detail allowing a hook, or a lure having a hook, to engage with a differing lure portion or popper head member to form an alternative lure assembly in a rapid manner.

What is also not appreciated is the need for such a lure-type kit construction that allows for ready adaptation and modification to fishing conditions without having to replace the lure body member itself.

What is similarly not appreciated by the related art is the need for a kit or system allowing improved use of scent, light, sound, weight motion/action, colorants, and fish-bite attractant textures that overcomes the difficulties noted above.

What is similarly not appreciated by the related art is the combination of a lure that includes a plurality of internal channels for receiving ones of scent, light, sound, and weight-motion/action modifying inserts.

Additionally, what is not appreciated by the relate art is the inclusion of a weighted or rattle-sound type generating member that is positioned internal to a flexible lure allowing for secure engagement and ready shipping as a kit for a post-purchase user.

What is not appreciated by the related art is the need for a lure having a physical structure capable of giving retrieval action that resembles an action simulating wounded prey in a visible manner, for example, including fish-visible bite-wound damage that may cause non-uniform lure action during retrieval.

What is also not appreciated by the related art is the need for a lure that may additionally include ribs or rib-like grooves along the sides of a lure that induce a lure to wobble or aid bending as the lure moves.

Accordingly, there is a need for an improved flexible lure that indicates a physical bite-wound damage site, involves a red-wound colorant proximate the damage site, and includes rib-like grooves to induce a wobble movement, ultimately rendering the lure less fluid-dynamic during retrieval.

SUMMARY

Due to the system-type and kit-type-nature of the present system interchangeability will be recognized by one of skill in the art studying this disclosure will recognize; and such a skilled individual will also necessarily note that each and every embodiment of the present invention need not match each object or aspect of the invention discussed below. Nor will each object or aspect of the invention be reflected in every claim. As a result, the features, systems, and assemblies noted and discussed in terms of their multiple aspects must be considered flexibly and not in a rigid lock-step analysis with any particular aspect or object.

One optional and alternative goal of the present invention is to provide a flexible lure system and adaptive kit system that responds to at least one of the concerns noted above.

The lure system and kit according to the present invention departs substantially from the conventional concepts and designs and in so doing provides an apparatus developed for the purpose of imitating the sight, sound, and natural movement of a wounded bait animal that is adaptable via selectable and interchangeable features to a variety of specific wounded bait animal species having widely different prey-avoidance demands. Similarly, a user may wish to adjust the specific features of the wounded bait animal to attract a specific type or species of predator game fish. For example, a wounded bait animal may be prayed upon by two species of predator game fish, one which feeds in the morning and prefers the scent of fish blood, and one which feeds in the evening and is insensitive to fish blood but is attracted to light and glitter or bubble generation. Here, a user may tailor the features of the wounded prey animal to match the desired predator game fish.

Another optional and alternative goal of the present invention is to provide a lure that includes one or more internal open-ended or closed-ended channels for receiving optional sound, scent, light, and weight modifying inserts or may act also as chambers (without exit), or as passage ways to other exit points on a lure; including nair openings, gill openings, belly openings, tail openings, back openings, etc.

Another optional and alternative goal of the present invention is to provide a lure kit or system that enables replaceable fin features for ready assembly prior to production and modifications in the field of use, for example upon fin-loss or fin-damage.

Another optional and alternative goal of the present invention is to provide an internal sound generating device; namely a rattle-type fishing tackle sound generating device as well as any other type of sound generating device (for example a loud bubbling sound) insertable within a flexible lure, or an internal light generating device; namely a chemical light stick member positioned removably internal to the lure, and selectable by color (red, orange, green, blue etc.) to enhance wounded prey-fish lure-attraction. It is also contemplated that a light, or small-sized LED (light emitting diode), with computer enhanced programmable action imitating, sequence, intensity, color etc. may additionally be employed.

Another optional and alternative goal of the present invention is to provide an improved lure that indicates a physical bite-wound damage-type indicator, for example the use of internal glowing red-light to illuminate a wound site, the use of unbalanced or damaged fins, the use of a fin member on only one side, the use of damaged top fin members.

The present invention relates to a flexible fishing lure is provided that includes a outer shape having a transverse opening for receiving a plurality of alternatively formed lure fin members allowing a user to change the action of a lure by fin selection without replacing the lure. Multiple internal channels within the lure are adaptively provided for receiving a variety of scent sticks, sound generators, light generators, flavor generating means. Flow internal channels extend from a front opening to gill openings or fin or nair/nose allowing a water flow along an inserted scent or flavor stick member to pass through the lure body and exit proximate fin, gill, or nair locations simulating an injured or wounded prey fish. Other adaptive features enhance a lure attraction or simulate wounded features. Adaptive fins and weighting constructions allow a use to tailor a weight and action of a lure enabling a circling or injured motion during retrieval. The lure includes a flexible holographic-type attractive film and includes a physical shape having a level-maintaining physical shape and easy retrieval but with improved attractive play (increased relative flexibility). Additional rib-like side grooves induce a wobble movement and a fluid disturbance to enhance the fish-attractive features during retrieval. The present invention also proposes that the inclusion of a rattle-type sound generating member retained elastically within the lure body will improve fishing results, and lure-user fishing pleasure.

In another optional and alternative embodiment of the present invention, either flexible or rigid lure bodies may include any form of decoration or attractive features that are known to those of skilled in the art or identified in the references incorporated herein by references.

According to another optional and alternative embodiment of the present invention, there is provided a flexible fishing lure system, comprising: a fishing lure body, the lure body being flexibly formed and having an outer periphery, at least one means for receiving and securing a fin in the lure body, the means for receiving including at least one fin-receiving opening, and at least one replaceable fin insertable in the one fin-receiving opening, whereby the fishing lure may be readily provided with replacement fins.

According to another optional and alternative embodiment of the present invention, there is provided a flexible fishing lure system, wherein: the fin is optionally a flexible fin and a rigid fin, and the fin includes at least one of a profile-shape selection, a color selection, and a size selection, and a raggid-bitten-shape selection, whereby the fishing lure system enables a user to readily assemble and replace the one fin to match one desired by a predator fish.

According to another optional and alternative embodiment of the present invention, there is provided a flexible fishing lure system, further comprising: at least one means for making noise, and means within the fishing lure body for replaceably receiving the means for making noise, whereby the lure system enhances a fish attracting feature.

According, to another optional and alternative embodiment of the present invention, there is provided a flexible fishing lure system, further comprising: at least one holographic attractive film within the fishing lure body, whereby an attractive ability of the fishing lure system is improved.

According to another optional and alternative embodiment of the present invention, there is provided a flexible fishing lure system, wherein: the lure body is formed from a composition containing a flexible polymer, preferably silicone.

According to another optional and alternative embodiment of the present invention, there is provided a flexible fishing lure system, wherein: the fishing lure body further includes at least one recess in the lure body as means for representing a wounding-region feature, and the at least one recess means includes at least one of a bite-mark type recess and a ribbing-type recess, whereby the at least one recess improves an attraction feature of the fishing lure system.

According to another optional and alternative embodiment of the present invention, there is provided a flexible fishing lure system, wherein: the means for representing a wound-region includes the bite mark recess with the a location of the bite-mark recess being at a selection position between a head of the lure and a tail region along a bottom belly of the fishing lure.

According to an optional and alternative embodiment of the present invention there is provided a flexible fishing lure, comprising: a preformed fishing lure fish body, the lure body being flexiblely formed and having an outer periphery, means for representing a wound-region on the lure body by forming a recess inset in the lure body relative to the outer periphery, and the recess includes at least one of a bite-mark recess and a plurality of rib-type recesses along a bottom belly and side region of the lure, and a wounded flesh color reflecting light alone or in combinations in the wavelengths of red, orange, and yellow.

According to another optional and alternative embodiment of the present invention there is provided a flexible fishing lure, wherein: the recess is the bite-mark recess, and a red-color wavelength reflecting region is proximate the bite-mark recess, whereby the red-colored region represents a red-blood color reflection of natural blood, thereby enhancing the attraction of an external game fish to the lure.

According to another optional and alternative embodiment of the present invention there is provided a flexible fishing lure, wherein: the recess is both the bite-mark recess and the plurality of rib-type recesses and an irregular shaped (teeth-marked) type recess, whereby the combination of the recess types function to cause the lure to wobble and flex during use to enhance prey attraction.

According to another optional and alternative embodiment of the present invention there is provided a flexible fishing lure, wherein: the recess is the plurality of rib-type recess along a bottom belly and the side region of the lure, and the rib-type recesses are at least one of a group comprising: dual side recesses, slanted recesses, recesses along a portion of a perimetral boundary of the outer periphery lure, and recesses in alternating patters about an common lure center line, whereby the rib-type recesses may be readily selectable by a manufacture to achieve a desired retrieval play action of the lure.

According to another embodiment of the present invention there is provided a flexible fishing lure, wherein: the lure body is formed from a composition containing silicone.

According to another embodiment of the present invention there is provided a flexible fishing lure, wherein: the means for representing a wound-region includes the bite mark recess enabling a location of the bite-mark recess at a selection position between a head of the lure and a tail region along a bottom belly of the fishing lure.

According to an optional and alternative embodiment of the present invention there is provided a flexible fishing lure, comprising: a preformed fishing lure fish body, the lure body being flexiblely formed and having an outer periphery, means for representing a wound-region on the lure body by forming a recess inset in the lure body relative to the outer periphery, and the recess includes at least one of a bite-mark recess and a plurality of rib-type recesses along a bottom belly and side region of the lure, and a wounded flesh color reflecting light alone or in combinations in the wavelengths of red, orange, and yellow.

According to another optional and alternative embodiment of the present invention there is provided a flexible fishing lure, wherein: the recess is the bite-mark recess, and a red-color wavelength reflecting region is proximate the bite-mark recess, whereby the red-colored region represents a red-blood color reflection of natural blood, thereby enhancing the attraction of an external game fish to the lure.

According to another optional and alternative embodiment of the present invention there is provided a flexible fishing lure, wherein: the recess is both the bite-mark recess and the plurality of rib-type recesses and an irregular shaped (teeth-marked) type recess, whereby the combination of the recess types function to cause the lure to wobble and flex during use to enhance prey attraction.

According to another optional and alternative embodiment of the present invention there is provided a flexible fishing lure, wherein: the recess is the plurality of rib-type recess along a bottom belly and the side region of the lure, and the rib-type recesses are at least one of a group comprising: dual side recesses, slanted recesses, recesses along a portion of a perimetral boundary of the outer periphery lure, and recesses in alternating patters about an common lure center line, whereby the rib-type recesses may be readily selectable by a manufacture to achieve a desired retrieval play action of the lure.

According to another embodiment of the present invention there is provided a flexible fishing lure, wherein: the lure body is formed from a composition containing silicone.

According to another embodiment of the present invention there is provided a flexible fishing lure, wherein: the means for representing a wound-region includes the bite mark recess enabling a location of the bite-mark recess at a selection position between a head of the lure and a tail region along a bottom belly of the fishing lure.

According to another optional and alternative aspect of the present invention a lure system is provided that appeals to all five (5) senses of a game fish, with interchangeable fins, weights, rattles, lights, colors, and "Scent Stick" attractants and treble hook harness and multi universal inner chamber system.

According to another optional and alternative aspect of the present invention, it is proposed that the present invention creates the first fishing lure or soft plastic bait to have interchangeable and selectable sized pectoral, anal, lateral fins, this fishing lure can be made of hard plastic, soft plastic, wood, metal, or alternate material or combination of these materials, the unique fins stiffness, thickness, viscosity, and angle construction will alter the lure performance and can be made of hard plastic, soft plastic, wood, metal or alternate material or combination of these materials, these fins connect to the lure with removable locking pin or pins to secure fin into bait, these fins can be different colors, shapes, or clear with sparkles to simulate scales, they create a unique life like visual effect employing any technology presently known to those of skill in the art or noted in the incorporated references (the context of each of which is herein incorporated again) to the lure or bait while contributing and enhancing the realism and swimming action, they also give off a unique low frequency water turbulence that is picked up by the predatory fish as a lateral line to seam more realistic and life like, these fins also will change the vertical and horizontal decent of the bait they are attached to creating a glide effect, and altering the hydro-dynamic principals of the lure or bait enabling the same lure or bait to travel in different levels of the water column for extend period of the depending on the size fin used and the lift that size fin will give the lure of bait.

It is another aspect of the present invention that a fishing lure or artificial bait may include a "Scent Stick" or fishing lure flavor stick or multiples or combinations of the same; each of which serves as an attractant that is a water soluble hard or semi-hard/flexible stick that slowly dissolves in water based upon density and many other factors, permeating the surround areas with fish attractants, made of but not limited to fish oils, fish parts, fish scales, fish enzymes, fish fatty acids, fish amino acids, fish pheromones, fish blood, ground up worm, crayfish, shrimp, lobster, shellfish, and verity of fish species and other dies, scales, synthetic scales, having a particular dimension for insertion in the lure and having alternative physical forms to aid water flow and dissolution as will be discussed more fully below.

Another aspect of the present invention includes a "Bloody Anal Fin" display and/or a "Bloody Belly Wound" configuration, where the present bait or lure provides a unique impression that simulates a wound or previous attack bait fish damage in the lure's anal fin area that will genetically triggers fish to eat or to feed capitalizing on the easy-meal of a weak or wounded bait fish, this impression also acts an enhanced flex point, a wound and disbursement impression and a discontinuous region.

It is another aspect of the present invention to provide one or a series of chamber that run through the lure or soft plastic bait all have different functions but all work together as one unique system, they can be used individually for different functions, for a verity of uses, in a variety of locations (from head, middle, tail, top, bottom, side-side) of the lure creating a flex points, and disbursement wound feeling when being bitten by a fish that further stimulates and simulates a mark made by a larger fishing biting a smaller fish, these openings will also acts as a point of disbursement for the aforementioned scent stick scents through the scent disbursement chambers upon biting, and such biting will be further enhanced to feel softer by the reduced cross-sectional area of the lure, as well as a point of insertion for a float, rattle, colorant, light, or weight chamber and may also serve as a passage for an additional treble hook harness.

In various embodiments of the present disclosure, a kit may include an adaptable fishing lure system that may include a fishing lure body having a fishing lure body having a generally cylindrical shape, a fin member repleaceably attachable to the fishing lure body, a channel longitudinally extending through and within at least a portion of a length of the fishing lure body, a slot formed within an outer periphery surface of the fishing lure body, and/or at least one cartridge. A plurality of ribs may extend along an outer surface of the fishing lure body, and may facilitate bending and/or flexibility of the fishing lure body.

The fin member may include generally opposing fins such that when the fin member is secured to the fishing lure body the fin member The fin member may include a through hole, and the fishing lure body includes a hole. The holes of the fin member and the fishing lure body may receive a pin therethrough to secure the fin member to the fishing lure body. The fin member may include generally opposing fins and two generally symmetrical halves. The halves of the fin member may resemble feet in swimming motion (e.g., feet curling to propel the animal through water, one foot aligned along a first plane and another along a second plane to resemble a paddling motion, etc.). The fins may additionally include securing features such as ribs or a ring for securing the fins to a lure body or within a receiving opening or slot or fin receiving opening. The cartridge may provide a weight that causes an erratic motion of the fishing lure body when moving through water when the cartridge is positioned within the chamber.

The chamber may be configured to receive the cartridge therein and may be accessible via the channel. The fishing lure body may be formed from a resilient and/or flexible material. The cartridge may provide a stimulant (e.g., motion, light, sound, smell, float, weight etc,), and/or at least one chamber formed within the fishing lure body. The stimulant may be actuated and/or released when a fish bites upon the fishing lure system, thereby compressing the cartridge.

The above and other objects, features and advantages of the present disclosure will become apparent from the following description when read in conduction with the accompanying drawings, in which like reference numerals designate the same elements.

BRIEF DESCRIPTION OF THE DRAWINGS

By way of description only, embodiments of the disclosure will be described with reference to the accompanying drawings, in which:

FIG. 4 is a side perspective view of a fishing lure including a replaceable fin construction and a plurality of openings according to one aspect of the present invention;

FIG. 5 is a front view of FIG. 4 noting the bottom smooth surface;

FIG. 6 is a cross-sectional view along line 6-6 in FIG. 4;

FIG. 7 is a top view of a replacement fin;

FIG. 8 is a partial cross-sectional view along line 8-8 in FIG. 4 noting the hole for receiving the fin of FIG. 7 and the scent stick or rattle of FIG. 4;

FIG. 8A is a partial perspective view of an alternative bite mark showing a ragged edge as if from a toothed-bite of a prey fish;

FIG. 8B is the perspective view of FIG. 4 noting the use of an alternative fluid filled or rattle filled chamber that will fill the bite or would region and an alternative replacement anal fin member that can be similarly secured in place via two receiving holes and plugs; such that either of the chamber or the fin member may additionally include a fluid containing region to dispense taste fluid upon a biting of a prey fish;

FIG. 14C is a close up sectional view of the lure embodiment in FIG. 14 wherein a hook is inserted and the head member and the replaceable fin member attached by locking pins;

FIG. 14D is a partial perspective view of the region 14D in FIG. 14C wherein replacement eye members and locking stalks allow rapid replacement of lost eye features, replacement of eye colors, use of 'wounded-looking' or red eyes or different color eye-backing members;

FIGS. 15 and 15A' are partial views of the tail of FIG. 14, wherein a split tail is presented and optional positioning openings are presented in multiple aspects of the tail region;

FIGS. 15B, 15C, 15D, and 15E are side views of alternative insertable weight members having retaining structures which allow optional use of various weights without departing from the scope of the present invention;

FIG. 18I is a front view of a lure of the present system including a weighted fin and optionally a weighted retaining pin according to FIG. 18F, wherein such assembly causes asymmetric buoyancy of the lure and results in a rotation around rotation point R during retrieval and an associated yaw-rotation Y about the vertical center of the lure;

FIGS. 19A through 19D are side views of alternatively shaped sound generating and partially or fully insertable rattle members including alternative protrusion designs;

FIG. 19E is a combination of a sound generating device and a scent, color, taste, or other attractant stick within a holding member allowing joint combination within a lure body in the same insertion path as an optional variation of lure attractant;

FIG. 20 is an alternative construction of FIG. 14C noting the inclusion of an alternative hook feature via multiple optional internal body channels, allowing adaptive hook positioning;

FIGS. 21, 21A, and 21B show an adaptive key lock member for a universal lure attachment system, shown here with a preferred popper-head construction, wherein an attachment head receives a hook member and a key lock member to secure the same to a lure lead member, noting a hook-shank locking pin system for engaging a hook with a lure attachment. It should also be recognized that the hook may be firmly fixed to the head and simply driven/pushed into the lure body;

In FIG. 30, insertion openings, replaceable legs (in place of replacement fins), a bite mark and other items are noted;

DETAILED DESCRIPTION

Figure 1:
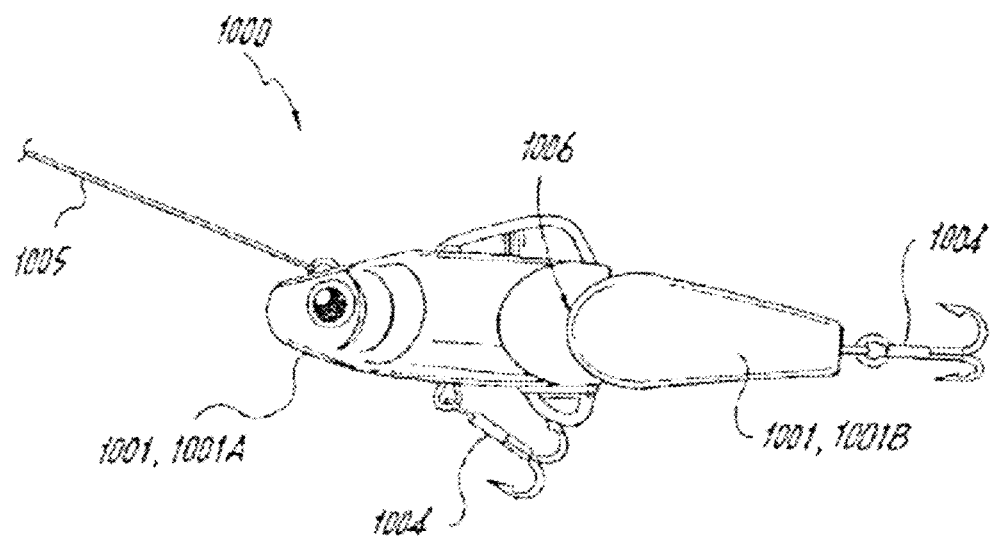
FIG. 1 is a side elevational view of a conventional fishing lure having a rigid segmented body.
Figure 2:
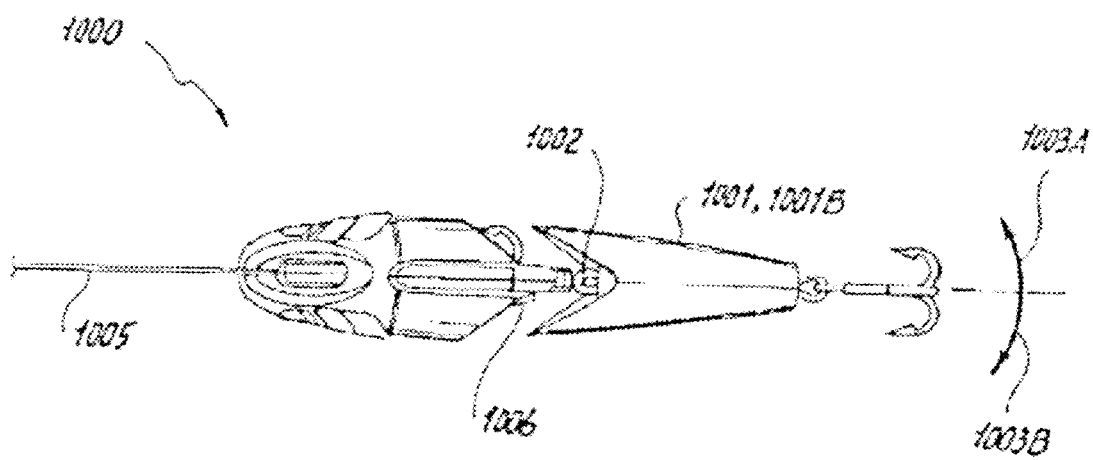
FIG. 2 is a top view of the conventional fishing lure shown in FIG. 1.
Figure 3:
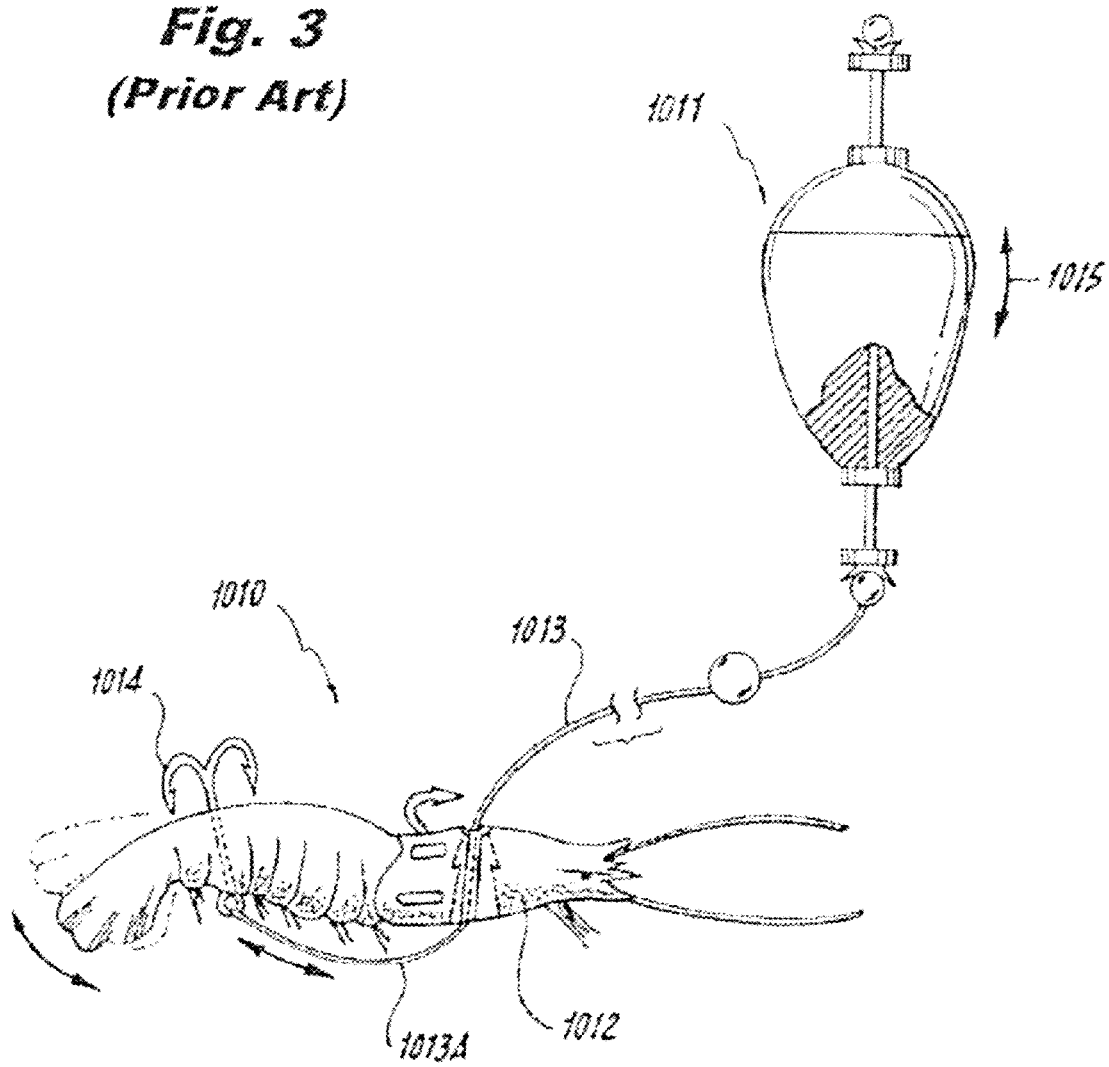
FIG. 3 is a side elevational view of a conventional fishing lure for a shrimp in combination with a conventional bobber member.

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, up, down, over, above, and below may be used with respect to the drawings. These and similar directional terms should not be construed to limit the scope of the invention in any manner. The words "connect," "couple," and similar terms with their inflectional morphemes do not necessarily denote direct and immediate connections, but also include connections through mediate elements or devices.

Referring generally now to FIGS. 4 thorough 8, a silicon based, elastomeric or plastisol type-fishing lure is provided at 100 in a similar plastic-forming technique as that noted in the earlier references incorporated herein again by reference. A series of recesses 15 along sides a body member 10 such that the bait lure is additionally rendered flexible and provides a life-like action to rod-motion during retrieval. Similarly, recesses 15 help to simulates "wounded prey" and will enhance game-fish strikes on the lure via lure/water interaction during retrieval.

Body member 10 includes a head region 1, a tail region 2, and a central region 3 between the two. Eye members 4 are provided along with gill colorants 5 in head region 1 or gill-molded regions 6 to simulate the gills and colorations of a live bait fish.

During normal operation, an eye ring 8 is fixed to a fishing line (not shown), and lure 100 is drawn through water via retrieval in a manner simulating bait-fish action.

During such retrieval tail region 2 flexes vertically as shown at A, A and also flexes horizontally as shown at B-B to simulate a fish-tail in a combined motion.

One or more recesses 15 are provided as shown and include one or more fully optional bite-mark recess 16 that pass from one side of the lure body 3 to the other, and a plurality of rib-type recesses 17 arrayed along a side portion of the lure body. In the side view noted in FIG. 4, the perimetral edge (the outer shape) is continuous when viewed, but as noted particularly in the cross-section in FIG. 6, recesses 17, extend inwardly to main body member 10, while the tail region 2 is visible in the rear.

During retrieval, water washes over recesses 17 causing lure 100 to additionally wobble, generate disturbances in the water, and otherwise bring instability in an attempt to attract fish. Recesses 17 may be in the form noted and positioned on the lower side periphery portions of lure 100. For example, recesses 17 may slant forward, rearward, vertically, and may be of deeper or shallower construction. As shown best in FIG. 4, the preferred recesses 17 are shallow channels formed during or after the molding process. It is envisioned that these recesses 17 may assist the user in tricking game fish into believing the lure 100 is "slashed" or exhibits a "bitten" and "injured" effect simulating "wounded prey" and hence an instinctive desire to bite.

Noting particularly FIG. 5, a bottom surface 101 and a sloped leading edge 102 enable lure 100 to pass through water and remain on a continual plane due to the long and reasonably flat bottom surface 101. Thus, the present invention proposes the ability to glide through the water without immediately diving or rising from an initially set depth allowing a user to "play" the bait in a convenient manner without undue effort to maintain a consistent use-depth.

As noted in the related art, it is additionally envisioned, that lure 100 may include internal holographic film 104 or other visual attractants formed internally so that as lure 100 flexes during fishing-use or strike, film 104 is readily observable to provide an improved attractant feature. Similarly, and without limitation to the present preferred embodiment, film 104, or any other type of surface colorant or formed feature (for example scales 105 in FIG. 1) may be employed on the surface of lure body 10 so as to glitter, and attract fish in a manner known to those of skill in the art.

It is additionally envisioned, that recess 16 as a bite mark may optionally included a wound-colored region 20, for example in the color red and related visual color wavelengths recognized by game fish such that the color selected represents blood or injury from the "now-wounded" lure body 10.

It is therefore proposed that the present invention simulates "wounded prey" unlike any other. It is also proposed that those of skill in the art will recognize the one or more "bite-mark" recess 16 because of the colorant (red) and because they think it represents a wound that will make the baitfish easier to catch. The "bite-mark" feature as discussed gives lure 100 an irregular wobble action that attracts fish, due to the removal of silicone material, weakening the integrity of the lure body 100 causing tail region 2 to flex and appear "weak" or "wounded". This weakness makes the lure swim or translate through the water during retrieval in an unpredictable and asymmetric way, simulating the weak or injured baitfish that predator species key-in on or are attracted to.

Additionally, the bite-mark recess features gives the lure an enhanced side-to-side wobble along lines A-A, B-B that additionally exposes any internal holographic or attractant foil and the holographic eyes 4 to more direct light than other lures. This feature allows lure 100 to seemingly change colors when it is retrieved through the water and gives off an easily visible, nature-type fish and glow that predator species are attracted to. Additionally, the red color signals to predator species is a signal of a wounded, injured, or vulnerable bait fish.

It will be recognized that recesses also work in tandem (the bite mark and the wounded rib-type features) to give the lure the life-like action of a sick or wounded fish. Here, rib-type recesses are formed by removal or non-molding of silicon or plastisol type material causing the lure to wobble and bend more as it swims. It is proposed that the overall shape of lure 100 works together to lure the game fish with a unique, unpredictable, and injured action not found in other fishing lures.

The present preferred embodiments include a number of additional attractant features. As noted in FIG. 4 through the end, one or more fin members 110 is provided and includes opposing fin-texture sides 111, 111, spaced by a generally central region 112. Fin member 110 fits and engages with lure 100 via fin-locating opening 115. Fin member 110 may be made from any suitable material to enable sufficient bending and flexing for installation within fin-locating opening 115 (FIG. 4), for example silicone.

While those of skill in the lure forming arts, as incorporated herein by reference again, and further to those incorporated references, fin member 110 may be formed in any suitably flexible, durable, and adaptive manner, for example the use of Silicon or plastisol in a gel form.

Central region 112 allows users to readily insert a leading edge (an end) of fin 110, ultimately pulling fin 110 through lure100 so that the two elements (body and fin) are in condition for use as a completed lure 100 (FIG. 6). Fin 110 may be formed or molded by those of skill in the art to include veining or fin-texture (as shown in FIG. 7), but there is no requirement that this combination be filed of any specific type.

As will be additionally noted by those of skill in the art, foil member 104 is considered to be "above" the normal plane of the fin-installation and so is not noted in FIG. 6, the cross-sectional view.

An additional feature combines lure body 100 with proposed rattle or noise making system 120 containing a bounding outer member 121, and at least one rattle member 121A and be shaped for insertion into a preformed opening 122, shown here as a circular passage, within lure 100. Noise making system 120 may be formed as shown and simply make noise by shifting during lure retrieval. As will be recognized by those of skill in the art having studied the present disclosure, passage 122 may be any shape or geometry sufficient to receive and retain noise making system 120 (shown circular, may be rectilinear, triangular, ovoid, etc.). As an additional benefit of the present system, lure member 100 may be provided in a combinable kit form (See FIG. 29) with a number of differing noise making systems 120 that may be combined in a variety of ways without departing from the scope and spirit of the present invention.

While lure 100 is shown in the particular format preferred, nothing herein shall restrict lure 100 to this particular form or shape. Thus, for example, tail region 2 may be generally circular, forked, spiral, etc. all without departing from the scope and spirit of the present invention.

Referring now to FIGS. 8A and 8B, it will be noted that alternative embodiments are presented. In FIG. 8A a raw or ripped-out wound feature is presented at 15' wherein a number prey-teeth marks 15'A are shown molded on either side of the lure proximate indication region 20 having a wound color. Additional a number of pseudo-ripped flesh tabs 15'B project and extend into bite region 15' to simulate the resultant injury from a ripping prey-fish action. In this way (FIG. 8A) the wounded-feature or wounded-indication system at 15 (et al.) may be adapted to various scenarios and to enhance the 'hunger/interest/instinct-impact' prey-fish have to strike the lure 100.

As will be noted in FIG. 8B, additionally region 15, 16 may be filled with replaceable feature members 16A, 16B having respective spud ear members 16A' projecting from either side to frictionally engage openings 122, 122 to retain feature members 16A, 16B in place. As shown, feature member 16A is a hollow region 16D bounding a volume containing a number of rattling ball members 16E that click together during retrieval to generate noise. Additionally, shown is an access portal 16F, allowing replacement of ball members 16E or the insertion of a fluid or powdered scent attractant (e.g., fish paste, blood, glitter etc.), so that upon a strike a game fish may remove member 16A and upon biting receive a scent disbursement into their mouth to increase their hunger; the action will also render lure 100 to appear to be wounded with the loss of "flesh" in the form of feature member 16A.

Feature member 16B is shown as a flexible fin member but may also be hollow having a stress concentration region 16B' such as a narrowing or a thinning in the wall of the fin so that any scent attractant stored therein will be dispersed upon the strike when the force applied preferably renders open the region 16B'. Similarly, feature member 16B will generate a similar wounded-flesh feeling in a striking game fish by delivering the scent and also by allowing them to feel a 'particle' of 'flesh' in their mouths enticing them to return to strike lure 100 fully. In this way, each of these feature members 16A, 16B may be employed to fill wound-feature 16 in a way that also enhances the attraction of the lure 100.

Figure 9:
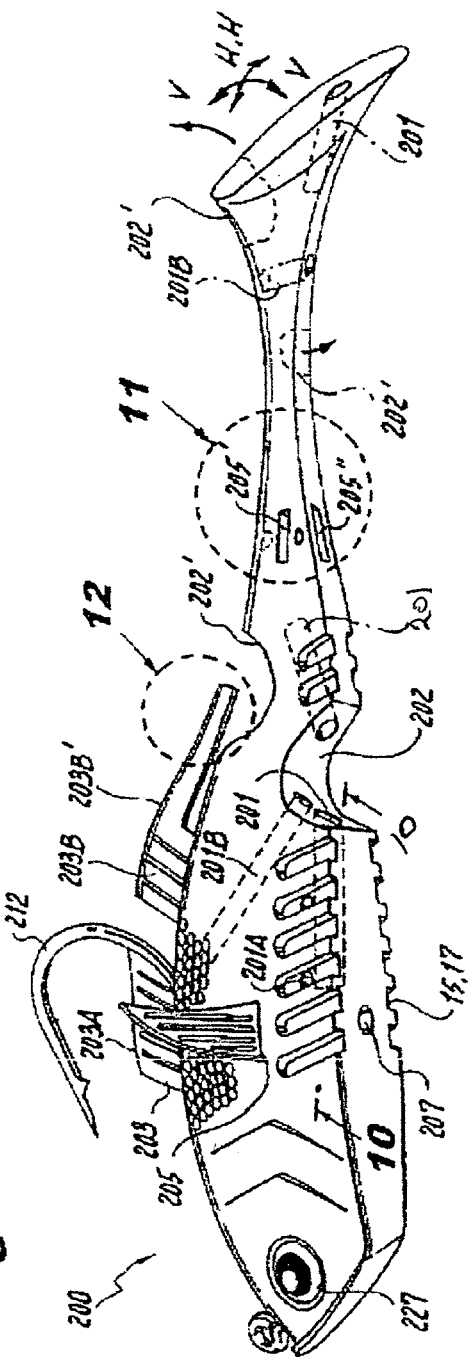
FIG. 9 is a side elevation view of an alternative embodiment of the present invention.

Referring now to FIGS. 9 through 12 an adaptive flexible lure construction includes a plurality of inner chamber members 201 extending from a lure entry location 202 into an interior of lure 200, or in the case of chamber 201B may pass completely through the lure body. In other cases, additional side chambers 201A may extend from an inner chamber 201 to an exterior of lure 200, as will be explained. As will be noted in the Applicant's related applications, lure entry location 202 may be formed as a 'bite mark' as noted in FIGS. 4, 9, but it will also be recognized that such bite marks may be positioned anywhere along the body of lure 200 without departing from the present spirit and scope of the invention thereby allowing an improved "wounded bait" appearance. For example, a bite mark may be near a top side or near a tail at 202' (FIG. 9).

Figure 12:
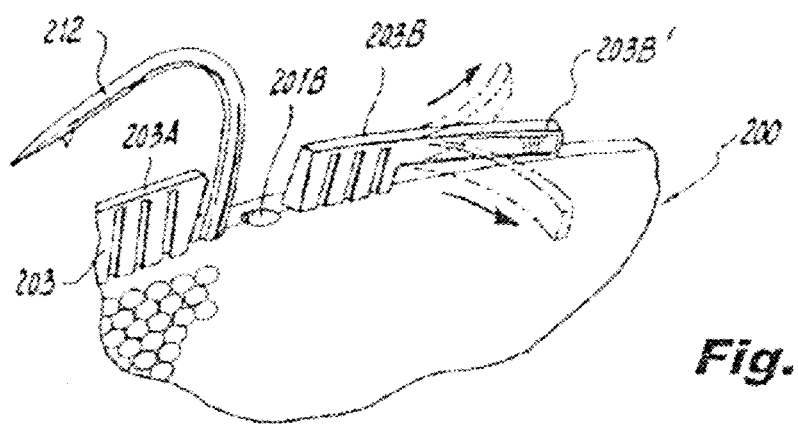
FIG. 12 is a partial perspective view of region 12 in FIG. 9 noting the exit of the transit body opening the top hook exit, the gap in the dorsal (top) fin, and to the flexible tail extending from the dorsal (top) fin.

Additionally, as noted also in FIG. 12, at least one fin member 203 is removably positioned and replaceably positioned along a top spinal axial direction of lure 200 and includes a front portion 203A, and a rear portion 203B, having a detached flexible flag portion 203B' that may be adaptively curved during manufacture to flutter during retrieval of lure 200 or may be loosely constructed, so that the appearance of a moving fin is given during retrieval of lure 200. For removably and replaceably positioning fin member 203 or fin portions 203A, 203B, it is envisioned that a channel insertion receives a portion of front and rear fin member 203 portions as shown and retains them until removed by a fish-striking action, allowing for their ready replacement or color selection upon a user choice or to be partially removed as an additional wounded-simulation feature.

A lateral or middle fin opening 205 extends transversely through lure body 200 from one side to the other and replaceably receives a fin member 206 (see examples at FIGS. 18D-18H), as shown that may be of multiple constructions as will be discussed. Extending from a bottom side of lure 200 is a channel 207 for receiving a locking pin member 208 (not shown see examples at FIGS. 17A through 17C) and for extending through an engaging hole 209 in fin member 206 to secure the same, as will be discussed.

As will be appreciated, the present construction allows an angler to actually customize the lure in situ (in process during fishing) in a plurality of ways without departing from the initial lure body, or between lure bodies. Such interchangeability allows immediate adaptation to fishing conditions, fish preferences, and other fish attracting details.

Figure 11:
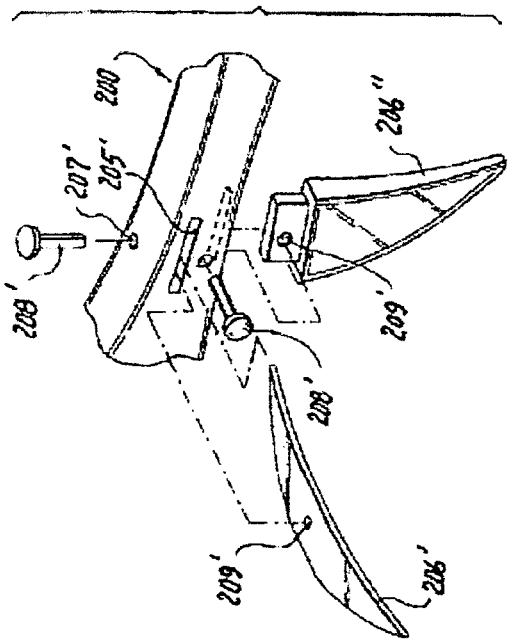
FIG. 11 is a partial perspective view of region 11 on FIG. 9 noting the alternative use of a secondary replacement side fin (similar to FIG. 4), and the additional inclusion of a bottom tail or second anal fin for the lure itself; each with a securing pin an a preferred but optional embodiment.
Figure 10:
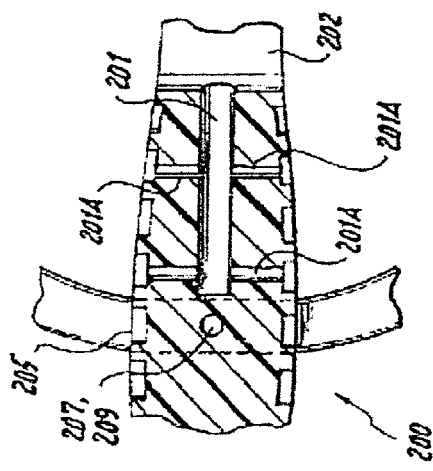
FIG. 10 is a partial bottom sectional view of the embodiment in FIG. 9 noting the positioning of the fin securing pin, and the use of multiple side passages to disperse attractant.

Referring now to FIGS. 9 and 11, an alternative position for replacement or insertable lateral fin member 206' or dorsal (bottom) fin member 206" is noted with associated through or insertion holes or openings 205', 205", and associated locking pin members 208', 208". In this way, one may reposition and remove fins along the length of lure member 200 to customize the lure as desired.

As noted additionally dorsal (bottom) fin member 206" may be provided in a hollow liquid-filled configuration (as shown) so that when bitten or opened, disperses the liquid filling and where the filling is a blood scent or other prey attractant provided an additional scent attractant to the system.

While lure 200 is shown with a paddle tail member 210, alternative tail constructions, for example a split tail construction 211 is noted in. FIG. 15A'. As such, tail member 210 may operate in any manner based upon the construction material for lure 200, and any predetermined inner cavity impacts. Tail member 210 may operate vertically along arcs V, V, horizontally along arcs H, H or any combination thereof.

Additionally referring now to FIG. 20, a top hook feature 212 projects from top fin member 203 and, as will be noted more greatly in detail in future figures (FIG. 20), an adaptive treble or other hook members 225, 225', and 225" having an attachment lead member 226 and a fixing loop member or link 227 will fix lead member 226 to hook 212 by simply sliding over the same (in a loop or a link) and may employ channels 201, 201A, 201B as passage ways for the inclusion of alternative hook members. Since hook 212 and hook 225 are physically linked together by link 227, a bite on either hook will capture the fish, and allow hooking-force to transmit along hook 212 to a user's rod a great benefit is provided as well as the flexibility to position hooks as desired within the same lure. Another great benefit is that hooks 225, 225', and 225" may be installed and removed by attaching to hook 212 without the need to re-tie and reconnect to the main lure-line allowing a speedy change with great security attached to main hook 212. This provides a unique advantage not found in the related arts.

Similarly, while hook 225 is positioned below lure 200, it will be readily recognized, that by adjusting a length of attachment lead member 226 (a cable, chain, strand, filament, etc.) a variety of other internal channels 201 may be employed without departing from the scope and spirit of the present invention. For example a tail extending hook 225', a dual back extending hook 225", or other location may be employed by simply feeding lead member 226 through a selected channel 201 to ultimately engage secured hook member 212 allowing force transfer. It is imagined that this tactic will be of particular use with game fish that attack from behind, as the major portion of hook 225' may be concealed within the lure body tail portion until hit by the fish.

As noted, in the figures (FIG. 9), one or more eyes 227 are provided. Additionally, the present discussion contemplates, and herein incorporates by reference all previously known attractive features and methods noted in the references that have been incorporated by reference herein, for example foils, sparkles, colors, etc.

Figure 14:
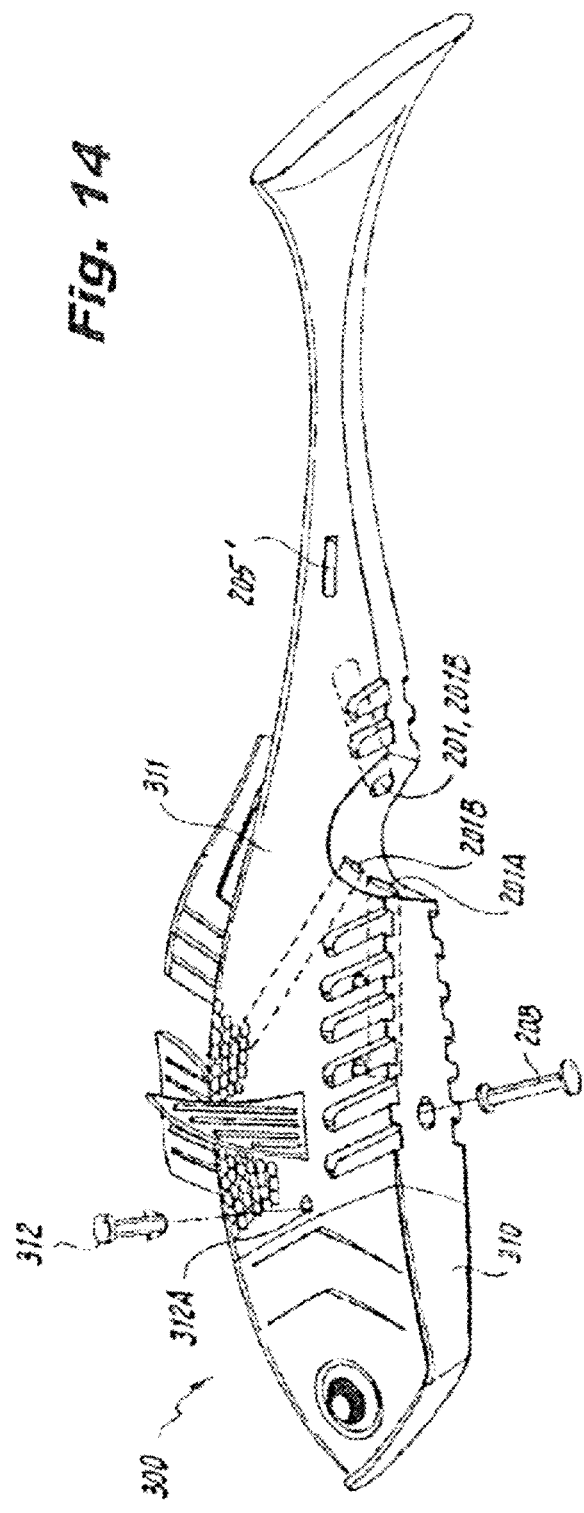
FIG. 14 is a side view of an alternative embodiment of the present invention showing a two stage removable head member and a segmented pectoral fin and a paddle tail construction with an exploded fin locking pin member.
Figure 14B:
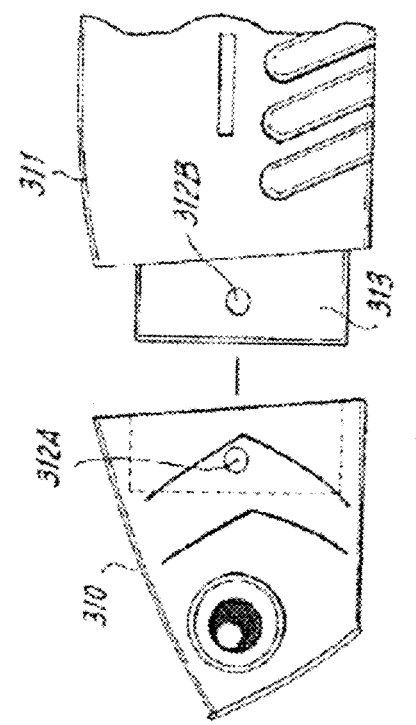
FIG. 14B is a partial view of FIG. 14 showing the removable head member in a removed condition with a locking pin secure hole on the head member.
Figure 14A:
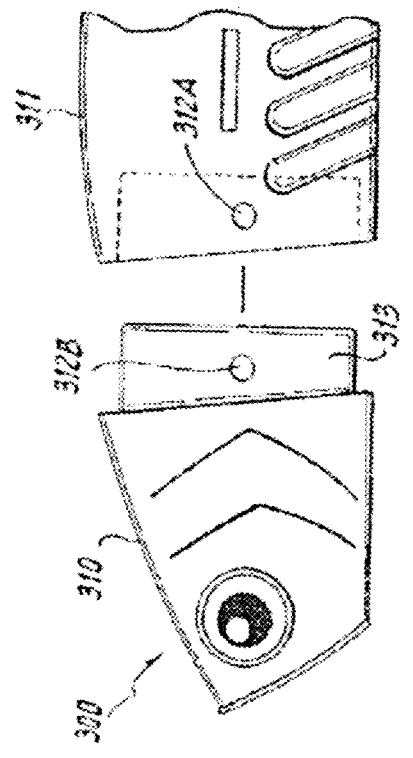
FIG. 14A is a partial view of FIG. 14 showing the removable head member in a removed condition with a locking pin secure hole on the main body.

Referring now to FIG. 14D an eye system 227' includes one or more replacement eye members 227A, each provided with a securing rod member 227B having one or more friction enhancing features 227C such as barbs, a rough surface, diameter changes etc, similar to those pins 208 to secure the fins. Additionally, a colored iris 227D may be additionally used in combination so that eye members 227 may be adaptively and removably secured in receiving holes 227E in the head member portion of any lure member. In this way, one of skill in the art having studied the complete disclosure will recognize that eye members 227A, or iris members 227D may be differently colored or with different reflective qualities and maybe varied on either side of the lure. Additionally, one of the eyes may be used with a red-color, or may be removed from the lure to indicate a wounded feature (eye loss). Of course, the present invention also recognizes that if eye-loss occurs at an undesirable time, a replacement eye may be easily inserted in the lure.

Figure 13:
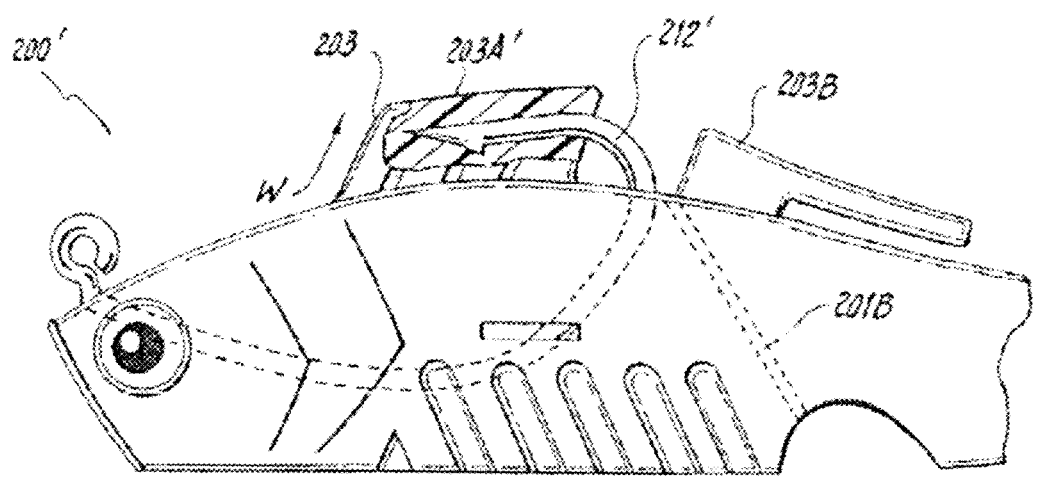
FIG. 13 is a partial side elevational view of an optional lure according to the present invention, wherein the lure is in a weed-free orientation as the point of the main hook is along-side of or partially in the dorsal fin allowing the dorsal fin to direct weeds and plant matter away from the hook during retrieval.

Referring now to FIG. 13, an alternative lure construction 200' is shaped with a weed dispersing or weed-splitting feature with a stiffened or lengthened front fin portion 203A' allowing hook member 212' to be positioned in contact on a side of fin203A' or to be imbedded lightly in fin 203A' (as shown) so that upon a fish strike the bite will free the tip of hook member 212' from the location near or in fin 203A to catch the fish. In this way during retrieval water flow (and weed flow) is along direction W which directs any plant or other matter off the hook to disperse the weeds away from hook 212'. In this manner, this weed-slitting feature may be employed with any of the other embodiments discussed herein to provide an additional optional feature.

Referring now to FIGS. 14, and 14A through 14D, an alternative lure construction shape 300 includes top split fins 203 and a plurality of channels 201, is 201A, and 201B, both in the body, head, and tail, and notes the inclusion of hook 212. In this embodiment an alternative construction includes a head member portion 310 form from a substantially rigid material such as wood, metal, or plastic, and a flexible body member portion 311 formed from a substantially flexible material such as silicone or plastisol as is known to those of skill in the art. A joining wedge member 313 extends from optionally head member portion or body member portion and includes a hole 312A in the body portion and a through hole 312B in the wedge member 313 for receiving a fixing pin member 312 with friction fit teeth members similar to the weight system or pins for fixing in FIGS. 17A-17C. In operation, a use may readily employ rigid head member 310 with a variety of replaceable flexible body member portions 311 in an interchangeable manner so that upon destruction or non-use damage to flexible portion 311 it may be quickly replaced.

Additionally, as shown in FIG. 14C, where a hook member 212 extends from rigid head member 310 it may be readily inserted into the flexible body member portion 311, as shown in FIG. 14C, to enhance lure construction flexibility.

Referring now specifically now to FIGS. 15B-15E, internal channels 201, 201A, 201B, in any location (body, tail, fin etc.) may receive optimally formed weights 230A-230D of a weight system formed from any conventional material and being either rigid, or flexible, or both. Insertion retention means 231, in the form of projecting ribs, hooks, or spikes project from outer surfaces of weight members 230A-230C to enable a secure insertion of the same within channels 201 and engagement within the walls thereof for a friction fit preventing unintended removal. It is particularly useful to rapidly change and vary the weights for lures 200, 300, as is discussed in the parent applications to this application, noted earlier and again incorporated fully by reference, so as to allow the lures 200, 300 to sink uniformly, non-uniformly, spin, or sag as desired to attract fish, and the present product may be sold as a kit, having a plurality of replacement weights and other features without departing from the scope of the present disclosure.

It will be additionally recognized, that weights 230A-230D in the weight system may additionally be formed as fin members 206 (See FIGS. 18DA-18H) and insertable into respective body fin holes 205, 205', 205", 115, and any other fin hole receiving location, to additionally weight a lure to enhance an attractive action, for example a balanced location of a weighted front fin may be further enhanced by the insertion of a weighted stick in a tail section of the lure, as was disclosed in FIGS. 15, 15A.

Additionally, weights 230A-230D in the proposed weight system are not restricted to the shapes shown, but may be of any shape capable of use with the lure system proposed. These weight shapes include, but are not limited to barrel shapes, round shapes, spherical shapes, split shapes, fin-type shapes, or lastly the shape of the fin-fixing pins 208, 208' etc. may also be formed from a heavy material like metal to act as a weight.

Referring now to FIGS. 16A through 16F a plurality of so-called scent sticks 231 in a scent stick system are providing in differing physical forms and having differing physical make-ups. It is envisioned that any adapted scent stick may be removably inserted in inner channels 201, 201A, 201B, etc., and may be combined with any other type of weight, or scent stick, or color generating member, as will be discussed.

As noted, scent sticks may include a blood scent, a flavor scent, may generate bubbles or oxygen via chemical reaction with surrounding water, and may generally be selected from any type of fish-attractant material that is pressed, squeezed, dried, evaporated, cut, extruded, or otherwise formed by known forming methods into a suitable shape. Similarly, scent sticks may be constructed from a number of solid and liquid compounds and even binders which when combined enable creation of a dried stick-like shape. For example, a scent stick may contain by weigh approximately 0-10% oil, 0-50% fish powder, 0-30% starch, and 0-25% shrimp, 0-40% dried fish blood in various combination with other taste or smell elements or in combinations with other visual elements such as glitter (cut flakes or small particles of reflective or brightly colored material) or bubble generating element (pressed $NA_2OH_3$, or other substance that reacts with water and generates visible bubbles), all in sum amounting to 100 weight % for each stick.

In a specific (but non-limiting) example, a scent stick may contain 5% fish oil, 30% fish powder, 25% shrimp, 35% dried fish blood, 2.5% organic binder and 1.5% glitter and 1% bubble generator. This type of scent stick will be substantially rigid when formed after drying but will absorb water/moisture during continuous use and will slowly dissolve over a period of time when exposed to water/moisture. The rate of dissolution will depend upon the pressure used informing or extruding the scent stick, the chemical makeup of the water (by salt content, by pH, by temperature, the volume of scent stick exposed to the water, and by free elemental percentage (e.g., % of non $H_2O$ in the water). It will be recognized by those of skill in the art having read and understood the present disclosure that these weights and percentages may be varied without departing from the scope and spirit of the present invention to provide a variety of selectable products.

Figure 16A:
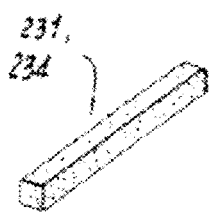
FIGS. 16A through 16F are prospective side views of alternative insertable scent stick constructions that may include scent sticks, bubble or oxygen generating sticks, blood sticks, light generating sticks, glitter containing sticks, or other attractants and multiple combinations of the same, and optionally dissolvable construction stick members having a variety of shapes.
Figure 16B:
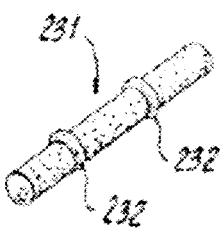
Figure 16C:
Figure 16D:
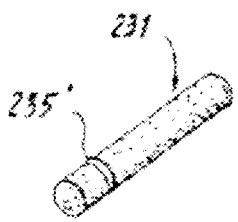
Figure 16E:
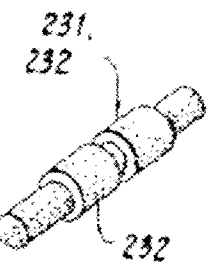
Figure 16F:
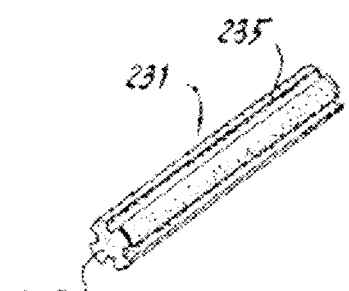

As noted, in FIG. 16B, scent sticks 231 may optionally include channel gripping members projecting as 232, may be formed in a shape not the same as the inner geometry of inner channels 201, such as a triangular shape 233, rectangular shape 234, or may have flow channels 235 along an outer surface so as to allow water to penetrate inner channels 201,201A, 201B, etc. and to flow along the surface of scent sticks 231, and react with the same to aid fish attraction when the water carries the dispersed scent from the lure into the prey fish's scent or taste senses (during trolling, retrieval, or during an actual prey fish strike).

Similarly scent sticks may be formed with stress-concentration features to create preferred fracture points (for example, periodic inward detents or grooves 235' (FIG. 16D, others not shown) along the outer surface of a scent stick or radial grooves about the outer diameter of the stick) so that when bitten by a game fish, a non-dissolved solid portion of the scent stick will preferably break off at the stress concentrator 235' and optimally exit the lure and enter the mouth of the game fish and be considered as a tom-off flesh-portion of a real wounded bait-fish to enhance the desire of the prey fish to consume the bait lure.

As will be additionally noted, scent sticks may be in fact a series of scent pellets or smaller shapes capable of insertion within channels 201 (all). Similarly such pellets or scent sticks may be constructed from combinations of types of scents (blood, flavor, bubble generating, etc.). Thus, in combination it is possible for an angler to customize the "scent load" within a given channel 201, selecting for example a combo stick, or small pellets in series of (blood, blood, bubbles, flavor), as the combination will readily be inserted into a channel 201 depending upon the location and length of a particular channel 201.

As will be additionally noted in FIGS. 19A through 19D, a series of sound generating members 240A-240D maybe formed for removable insertion along channels 201, and may include balls 241 that shift internally to make a rattling or clicking sound, in a manner discussed in the incorporated references. Similarly, it is envisioned that sound generating members 240 may also include protuberance members 242, 243 that may be additionally colored or may be illuminated by chemical light means to project from channels 201, or may be employed to fill "bite-marks" within a lure body as noted in FIG. 8B, for example. As also shown, herein sound generator 240 includes adaptive bulge member 243 to fill the anal opening in the lure to improve fluid flow and aid sound generation when in use. In this way it is envisioned that a user may selectively include a plurality of sound generators, light generators, and scent generators within the same lure in a manner customized for a particular prey fish.

It should be additionally noted that sound generating weights and their containers may be constructed from any suitable material or combinations of materials so as to vary the sound generated (for example glass beads make a different sound then lead balls). Thus, it is envisioned that a plurality of suitable materials may be employed including glass, Plexiglas, plastic, metals, stones, etc. all without departing from the scope and spirit of the present invention.

It is additionally included, but not pictured, that chemical color generators (so called light-sticks, or other small sight-type sticks noted in the sports industry) may be similarly inserted into inner channels 201 to attract game fish during evening or other times of day, and that these would appear in a similar stick configuration as in FIG. 19A.

Additionally included, but not pictured, are the inclusion of sound emitting diodes or other sound emitting electronic devices (small-sized) in the form of small sticks or units insertable into channels or openings in the lure body to aid game fish attraction.

Referring now to FIG. 19E it will be appreciated that a hollow tube member 240' may receive a sound generator 240A in combination with a scent stick 231 to provide a combined sound and scent or light attractant system that sharply departs from the related art and allows the use of lures 100, 200, and 300 (or any of the other bait shapes noted herein) under a wide variety of lighting and fishing conditions.

Figure 17A:
FIGS. 17A through 17C represent alternatively constructed fin locking pins for securing fin members (FIGS. 18D-18G) to a lure body constructed from any material including plastics, metals, rubbers, silicone, polymers, wood, and combinations thereof.
Figure 17B:
Figure 17C:
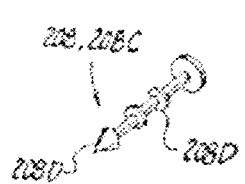
Figure 18A:
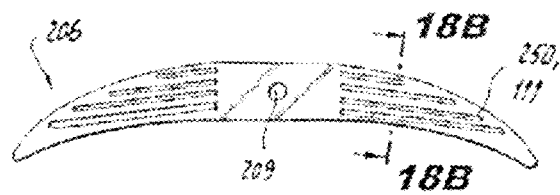
FIGS. 18A through 18H represent top and associated side or sectional views along noted sectional lines of replaceable fin constructions.
Figure 18B:
Figure 18C:
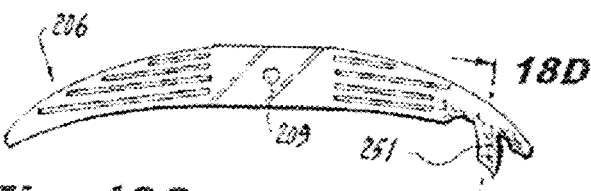
Figure 18D:
Figure 18E:
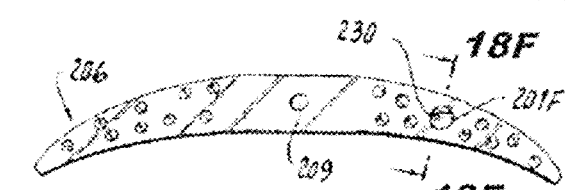
Figure 18F:
Figure 18G:
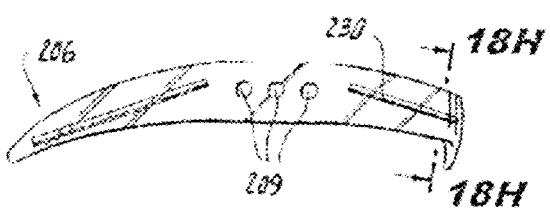
Figure 18H:
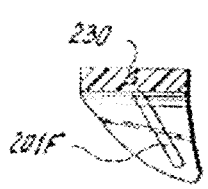
Figure 22A:
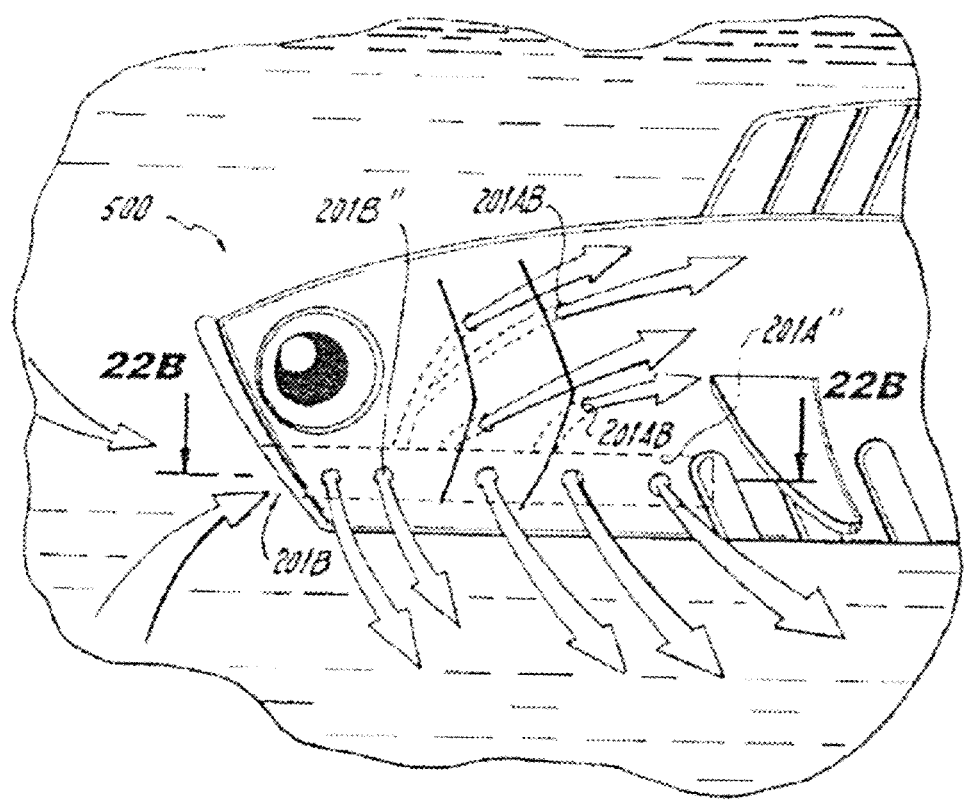
FIG. 22A is a side view noting a mouth or front entry flow channel connecting with gill exit channels of a lure construction.
Figure 22B:
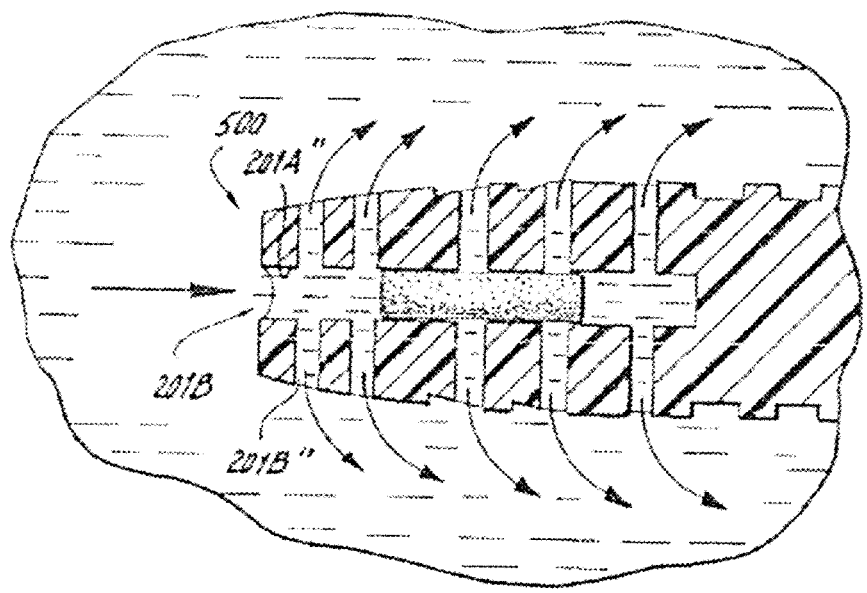
FIG. 22B is a partial top cross sectional view along line 22B-22B in FIG. 228A noting the inter-connection from a central channel allowing flow of scent or other taste attractant members from gill openings of a lure from a scent region.
Figure 23A:
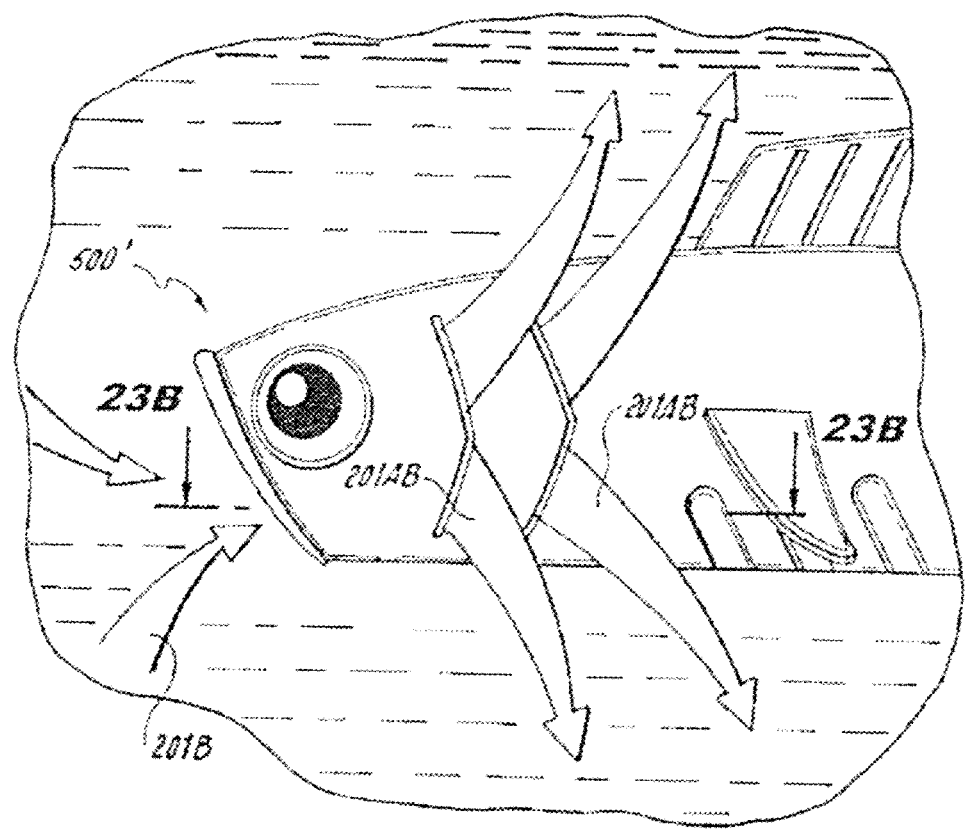
FIG. 23A is a side view noting a mouth or front entry flow channel connecting with gill exit channels only of a lure construction.
Figure 23B:
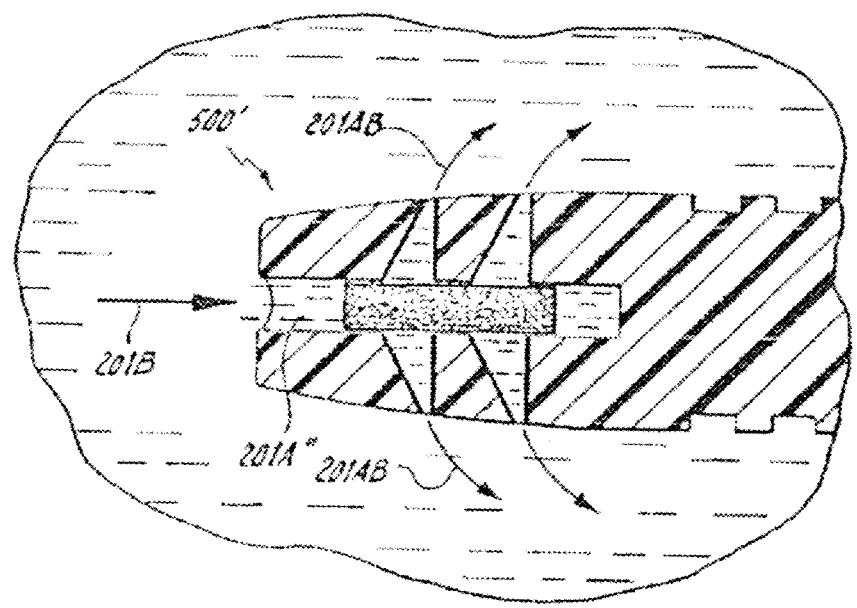
FIG. 23B is a partial top cross sectional view along line 23B-23B in FIG. 23A noting alternatively shaped inner flow channels to enhance water and volume flow.
Figure 24:
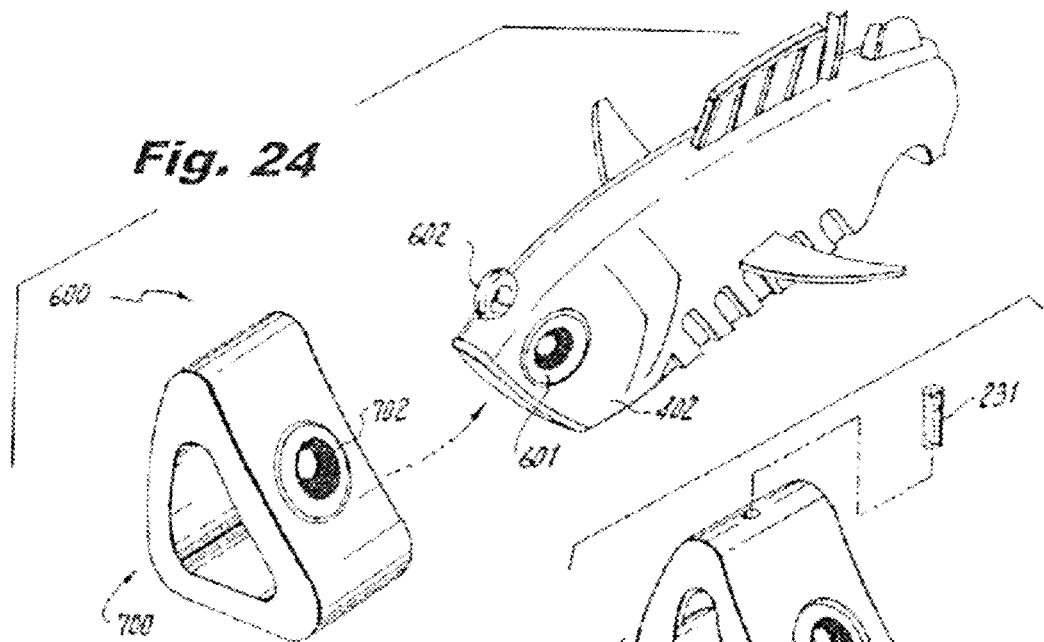
FIG. 24 is an exploded side view of a super-popper head member version adaptable to engage an existing lure.

As noted in FIGS. 17A through 17C a number of locking pins 208, 208A-208C are provided with a number of friction enhancing features 208D to secure respective fin members to the body of lures 100, 200, and 300, or otherwise secure a replacement fin or lure appendage (e.g., head members 310 in FIGS. 14, 14A, and 14B) upon a press fit into the respective receiving through hole.

Referring now specifically to FIGS. 18A through 18H a plurality of alternative fin-type constructions are provided. As noted in the present discussion, respective fins 206 may include surface textures 111 (FIG. 7) or as shown texture 250 such as veins, or gaps, may include a non-uniform or injured-appearing shape 251 having a shredded appearance. Similarly, fins 206 may be formed in any color, shape, and may include internal scent chemistry bound into the polymer as is known within the art (this is noted as decaying with time, a detriment immediately cured by the present invention. Colors may vary by side of the fins. A weight receiving channel 201F noted in FIG. 18H, similarly to channels 201 above, may be shaped to receive any form of insertable attractant discussed herein. Where a weight 230 is inserted in channel 201F (which may be a transverse or parallel orientation with a plane of the fin member 206), a single side fin member may sag (noted in FIG.18IH) causing lure 200 to circle downwardly upon cast, appear wounded, and otherwise attract game fish.

Similarly, a plurality of positioning holes 209 for receiving fixing pins or locking pins 208, may be provided allowing a user to position fins 206 off-center or off-balance to a lure body also increasing lure play and serving as an attractant.

Referring now to FIGS. 21, 21A, and 21B, an alternative system for a hook lure lock system includes a head member 415 having an inner receiving cavity 410 and an external attachment point 416 for joining with fishing line or other structure. An external slot 411 is provided for receiving a locking pin member 410 in a flush-manner as will be noted from the construction design. A removable hook member 420 having, an eye socket is provided conventionally, or custom made to fit within socket 410 and based on the orientation of the eye socket is prevented from rotating relative thereto.

Alternative locking engagement members 410 may be shaped to fit within flush opening 411. Alternatively an extending pin member (not shown) inserts along inner opening 410A so it engages with pin 410 and engages head member 415 with the hook 420 within inner opening 410A to affix both the locking pin 410, and the hook member 420 to head member 415. Because it is optionally intended for an extending pin member 403 to pass through the eye opening in hook member 420 and lock to head member 415, a secure force transfer path is created from eye member 416 back to the end of the hook.

In this manner, it is suggested that a suitably constructed head member may be readily joined to any number of conventionally shaped hook members or even suitably or custom made hook members.

Referring now to FIGS. 22A, 22B, 23A, and 23B, alternative lure systems 500, 500' are provided formed in manners discussed herein and incorporated by reference. A series of inner channels or openings 201B are now positioned at the lure head to receive water flow from the retrieval action and urge it along an interior passage way or even an internal chamber 201A". As will be noted, additional side passages 201W' may connect main channel 201B" to locations is 201AB proximate the gills of a lure, or optionally via channels 201A" to a series of "nair" openings to the front of the lure. It is envisioned that one or a series of scent sticks (shown) may be inserted into front channel 201B and that water flow will pass over this stick and flow out the nair openings and gill openings to more readily simulate a bait fish. Additionally, upon receiving a strike-force, such strike force will force additional fluid flow along channels 201B (anywhere in the lure) and push out a "pulse" of scented water to further fix and secure the game fish to the bite fish.

Referring now to FIGS. 24A through 26, an alternative construction is suggested in lure system 600 including a lure body 402 and a "supper popper" type head member 700 that is removably joined to lure body 402 via compression or other suitable means including use of a locking pin 208, 208D. Lure body 402 includes an eye 602 for securing a hook but this is not required.

Head members 700, 700', and 700" are constructed from elastic and buoyant EVA foam or other suitable material and has an inner shape and diameter to fit over the outer shape and diameter of a lure in a snug way securing an elastic fit, and potentially being physically restrained by eye member 602.

Figure 25A:
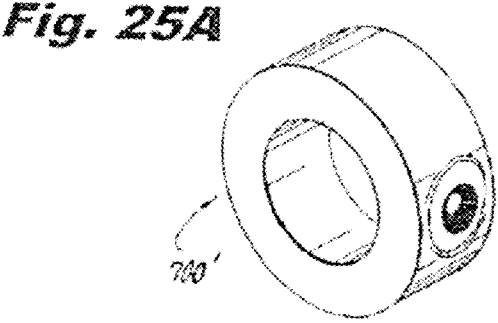
FIG. 25A is a front perspective view of an alternative cylindraceous super-popper head construction configures to secure cylindraceous lures.
Figure 25B:
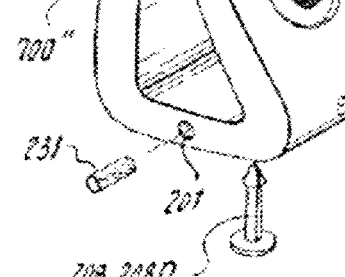
FIG. 25B is a front perspective assembly view of an alternative super-popper head construction configured to enhance lure action and including a plurality of inner channels for use in a manner discussed herein (including scents, weights, color or light generators, etc.) with an optional secure locking pin to secure the same to the lure.

Head members 700, 700', 700" may be simply a cylinder as noted in FIG. 25A, or may be formed on an inner and outer surface to enhance action, as noted as head member 700' in FIG. 25B, or may be formed in any other way to enhance fishing action—for example, head member 700, 700', 700" may be formed as a slider for skimming lure (skimming surface 600 proximate bottom of 700" in FIG. 26) along a surface of the water, or may be formed in any other surface or sub-surface action modifying shape without departing from the spirit and scope of the present invention.

Figure 26:
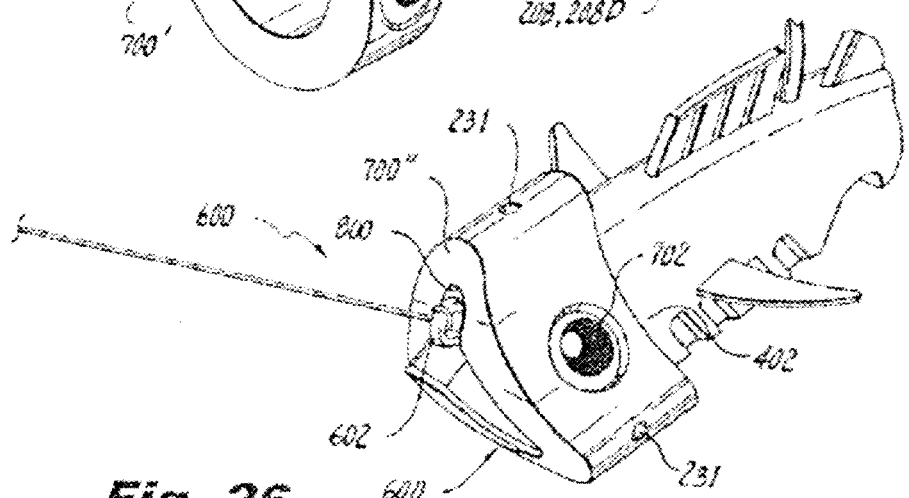
FIG. 26 is a side perspective view of an assembly as noted in FIG. 24 or 25B of the super-popper head and a lure body. It is noted that the hook engagement aids securing the popper head but this is not required and that the lure-line attachment remains on the lure itself and need not be transferred to the popper head as in FIGS. 21, 21A, and 21B.

In FIG. 26, a bottom plane surface and triangular head of head member 700" improve retrieval action, eye members 702 may readily replace/cover the lure's existing eyes 601, providing a larger "eye" target for attack. Similarly, head member 700, 700', and 700" may include a plurality of inner channels 201, or a plurality of stopped channels (called chambers) for receiving a plurality of attractant or control items (weights, sounds, lights, colors, scents, etc.) as taught in the present disclosure.

Additionally, while heads 700, 700', 700" may be formed of any material, including: wood, metal, plastic, elastomeric materials, and rigid materials; each material employed may require a different method for securing it to the underlying lure. For example, a locking pin 208, 208D, as earlier discussed may be insertable in a hole on a bottom surface of head member 700' and be pushed into the lure body to fix head member 700" in place. Additionally, as used herein, locking pin208D may be formed from lead, or any other metal for weight or strength enhancement. It is envisioned, that due to the extreme size of head member 701, that a plurality of openings, chambers, locking pins etc., may be need to control the action of the lure during retrieval. Also head members 700, 700', 700" may be colored or decorated in any manner known to the art and as identified in the references incorporated herein.

It is additionally envisioned, that the location of head members 700 et. seq. may need to accommodate hook eye member 602 to provide a uniform front surface to the retrieval action, whereby a restricted or concave portion 800 along a front surface of head member 700" is removed and receives eye 602 of the hook to allow head member 700 et. seq. to slide into position.

Figure 27:
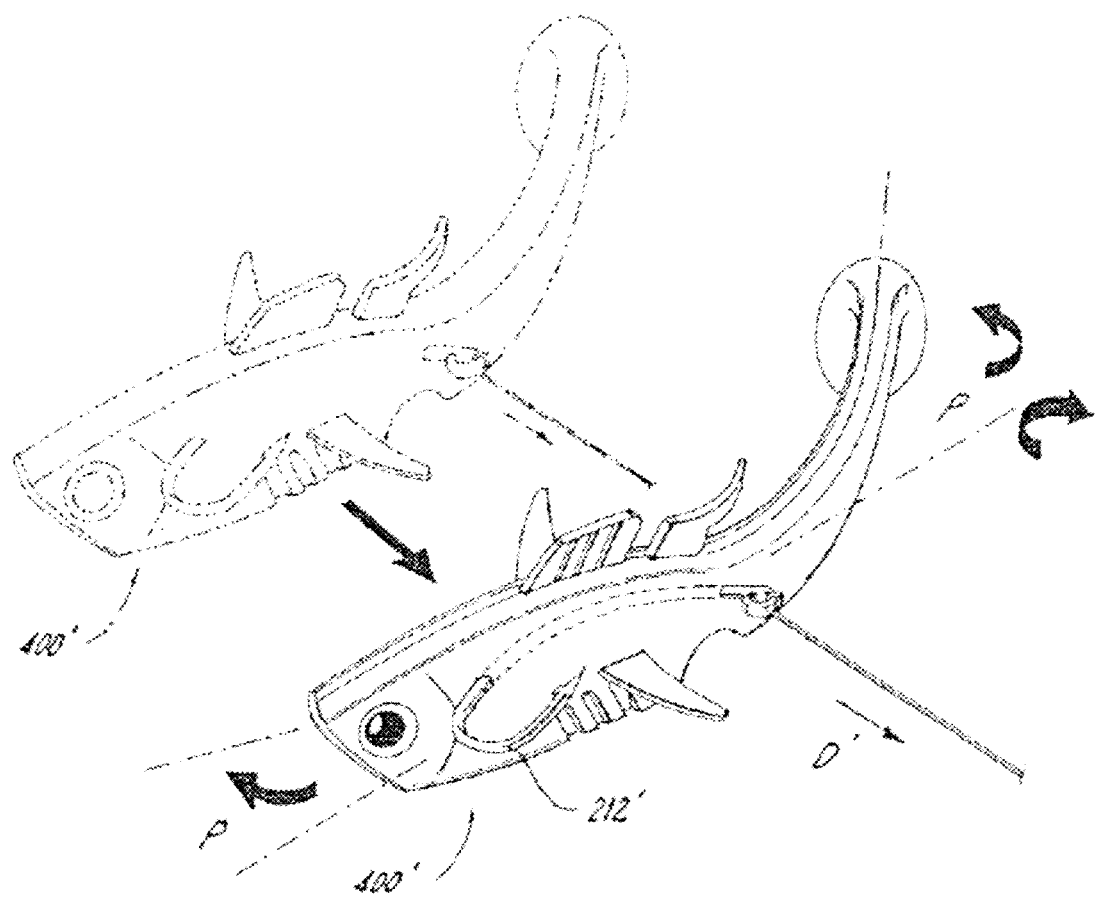
FIG. 27 is an alternative embodiment of the present invention wherein a hookless lure having the features discussed herein may be equipped with a side-mounted hook projected through the lure body or via pre-formed lure body openings at an angle that is non-parallel with the long axis-direction of the lure, allowing non-standard rotation and pivot action of the lure during retrieval.
Figure 28:
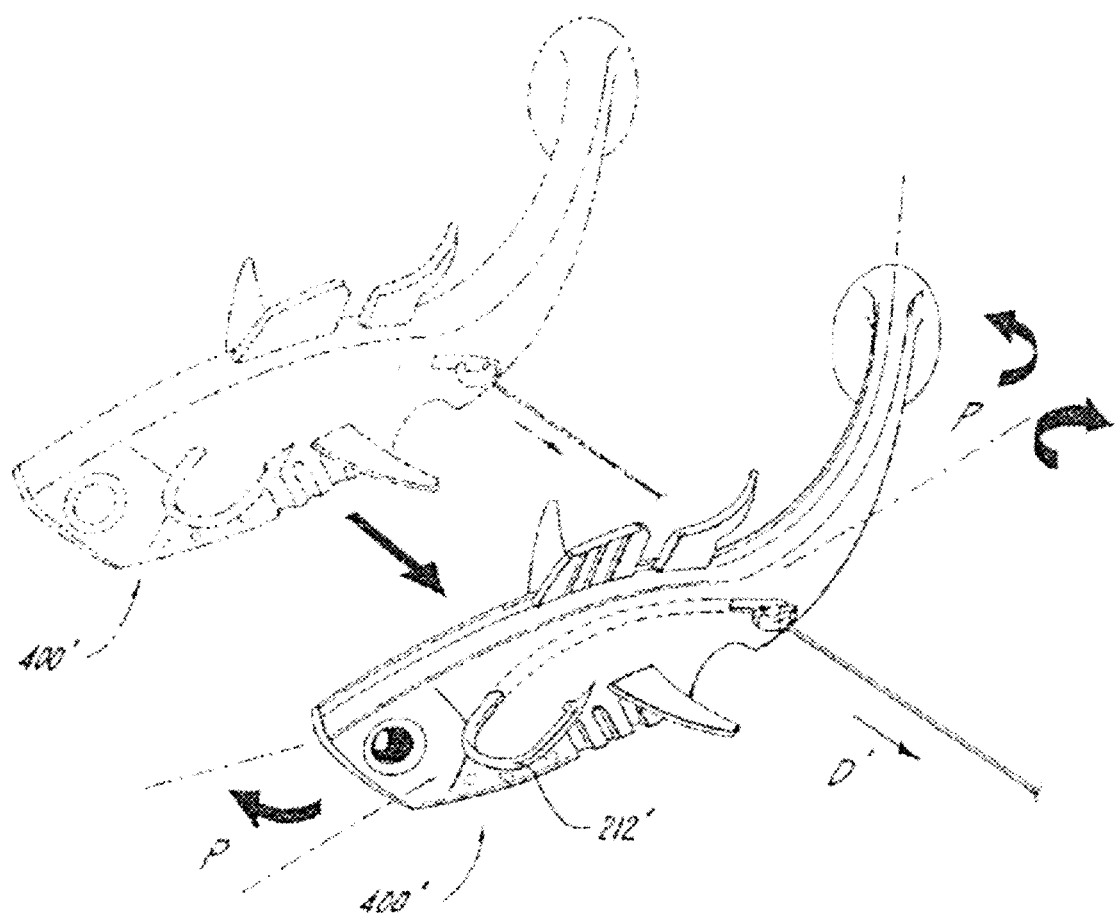
FIG. 28, is an alternative embodiment of the present invention similar to FIG. 27 wherein the look placement or position is perpendicular to the long axis-direction of the lure.

Referring now to FIGS. 27 and 28 an alternative embodiment of the present invention is provided at lures 400' and 400" wherein a lure body as earlier discussed with all of the features earlier discussed receives an external hook member 212' or 212" that is fed through the body of the respective lure in a direction that is off-angle or not in line with the long direction of the lure body such that drawing the lure line in direction D', or D" causes respective lures 400', 400" to pivot widely along directions P at the head and tail members to additionally simulate a wounded and non-naturally swimming bait fish as an additional attractant.

Referring now collectively to FIGS. 30 through 37 the earlier discussed features are adapted to a number of alternative lure forms without departing from the scope and spirit of the present invention.

Figure 30:
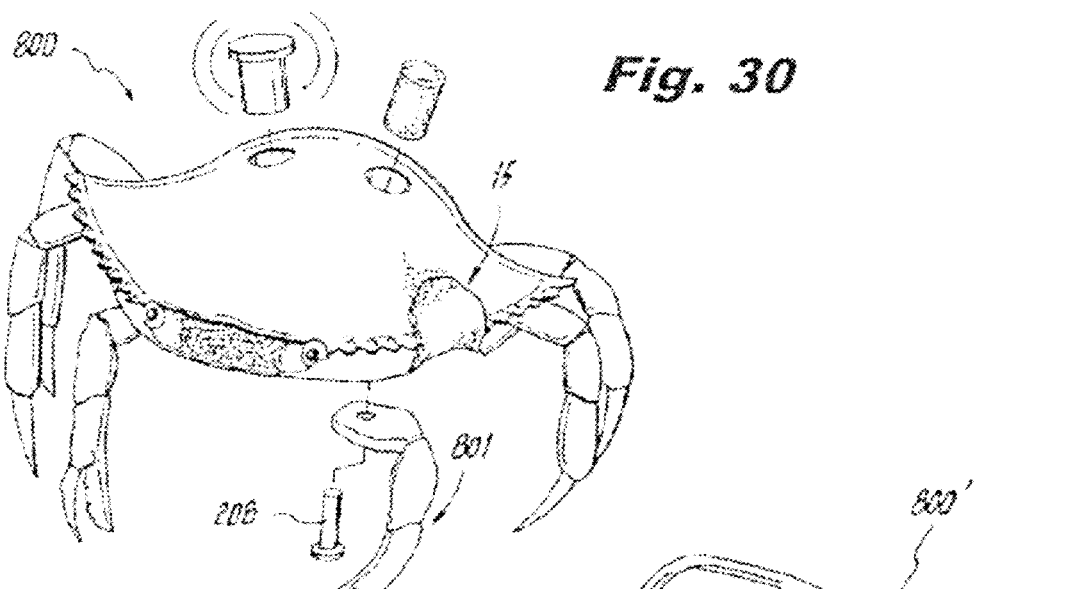
FIG. 30 is an alternative lure construction (non-fish) shown as a crab including each of the features noted in earlier discussions.
Figure 31:
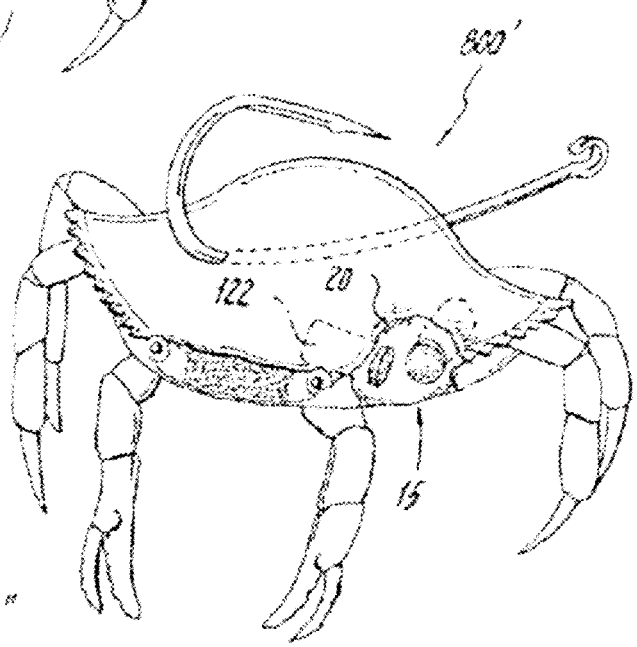
FIG. 31 is an alternative perspective view of the lure noted in FIG. 30 with a through hook, a bite-mark portion noting a wounded-quality and containing receiving openings for weights, attractants, bladders (as noted in FIG. 8B), etc. As similarly noted in FIG. 8A a ragged bite mark may be employed.
Figure 32:
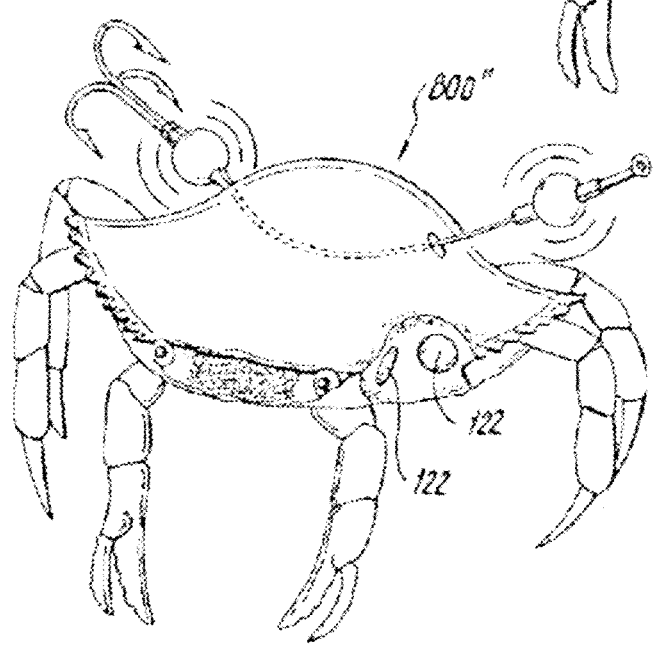
FIG. 32 additionally is similar to FIG. 31 wherein a through passage in the body of the lure is provided (as in FIG. 20) for passage of a hooked line.

Referring specifically to FIGS. 30 to 32 a crab embodiment 800, 800', or 800" is employed with a removable and replaceable leg member 801 employing a fixing pin 208 as earlier discussed. Similarly a bitten region 15 or 20 are provided where part of the crab embodiment is removed to simulate a wounded bait crab and provide a visually appealing lure to a prey fish. As also noted body openings 122 may receive lighted members, scent sticks or weighted members in the manners discussed above.

Figure 33:
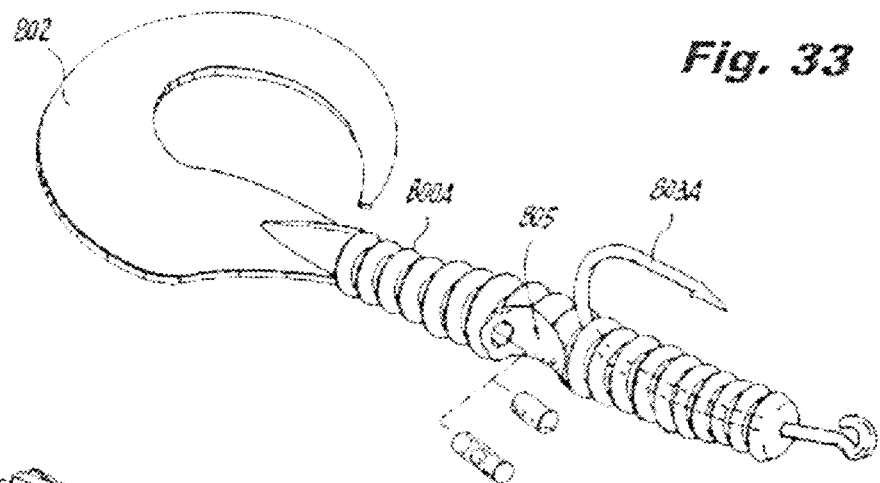
FIG. 33 represents an adaptive alternative of the present invention, wherein a silicon lure is presented as a shrimp, a worm, a leach or other generally lengthy member and includes a bite mark region noting a wound and an inserting member in combination with a hook.
Figure 35:
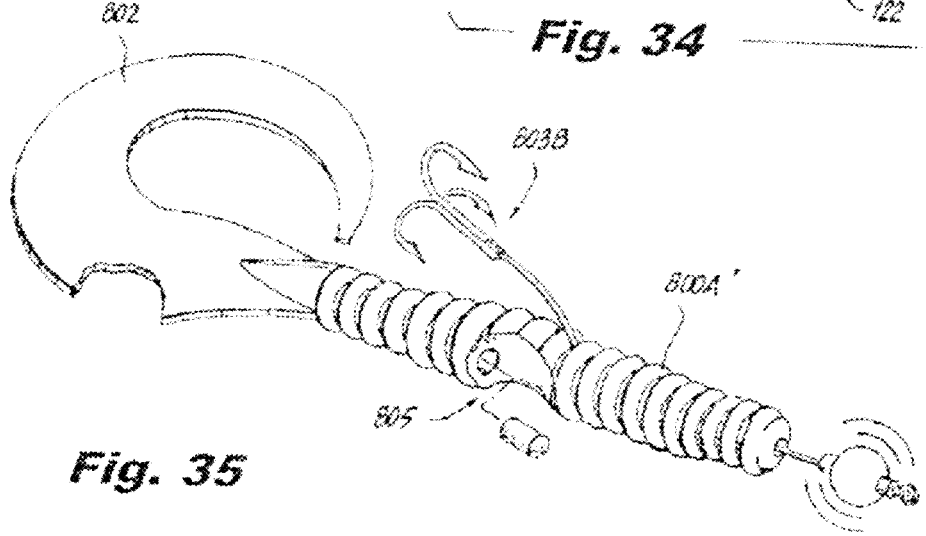
FIG. 35 is a flexible attractant view of the lure as in FIG. 33 but with a through-positioned treble hook member.

Referring now to FIGS. 33 and 35 a worm or shrimp type flexible embodiment 800A, 800A' provides a flexible curled tail802 and a hook member 803A, 803B that is either fixed in the body or fed through a body opening as shown in FIG. 35. What is additionally noted is a bite section 805 removed from the lure to simulated a wounded region and similar receiving channels 122 and sound, light, or scent generators as earlier discussed.

Figure 34:
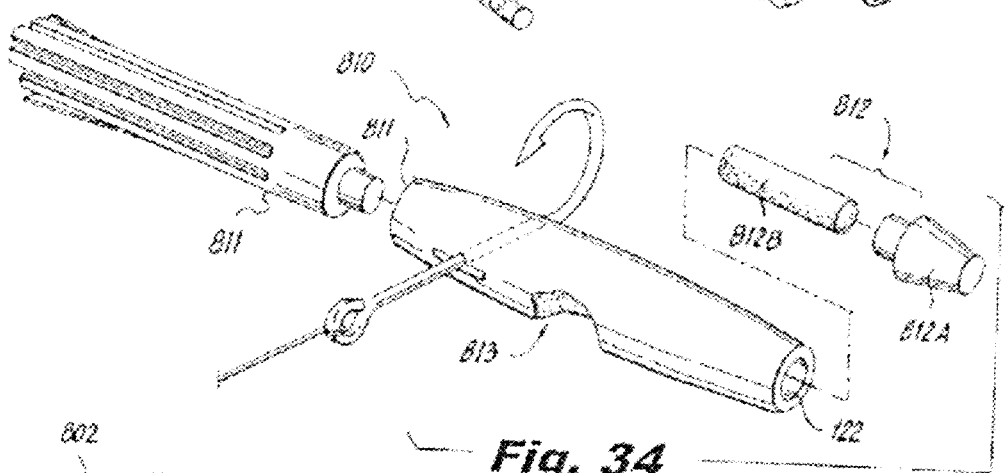
FIG. 34 is an exploded view of an alternative of the present invention, wherein a silicon lure is presented as a shrimp, worm, or leach (shown here), including a wounded region, replacement front tip with included scent stick or weight or other attractant member, and a transverse positioned hook.

The details in FIGS. 33 and 35 are similarly noted in FIG. 34 where a representation of a tiny shrimp or a leach 810 is provided with a body region 811, a flexible tail member 811 or a replacement head member 812 wherein a bite feature 813is provided as is a through opening 122 for receiving a scent member 812B.

Figure 36:
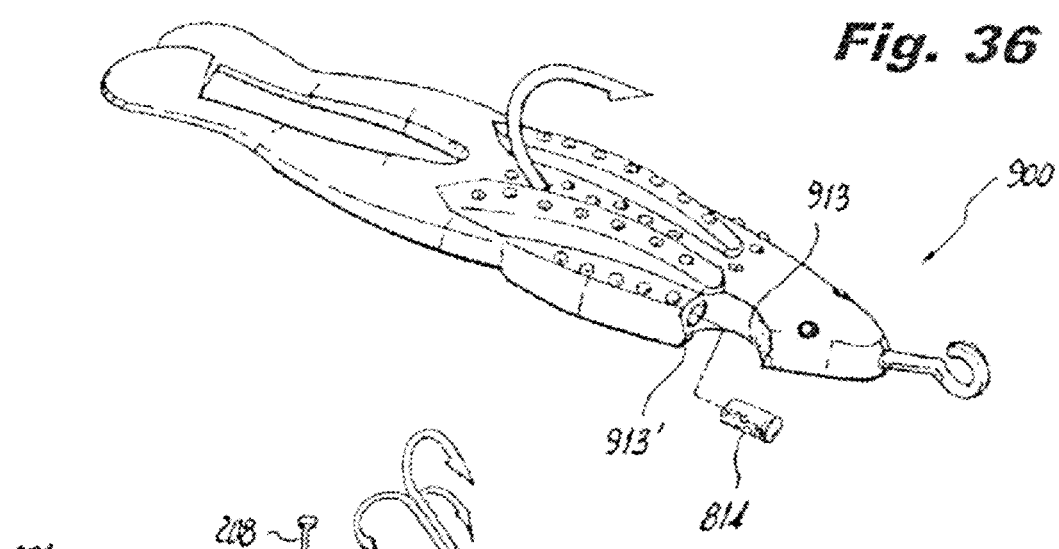
FIG. 36 is an alternative flexible lure according to the present invention, wherein a frog-shaped member includes a wounded region also including a receiving opening for receiving a scent or other attractive item.
Figure 37:
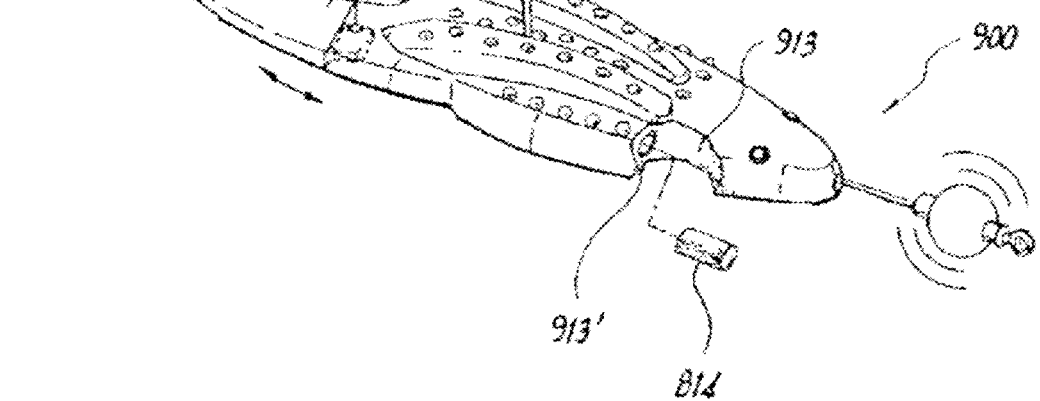
FIG. 37 is an alternative flexible lure, as in FIG. 36, wherein a replaceable member (the frog leg) is similar to the replacement fin member in FIG. 4 and may be replaced from a plurality of differently weighted, shaped, colored, and wounded type limb members.

Additionally, in FIGS. 36 and 37 a frog lure member 900 is provided with a bite or wound feature 913 and an opening channel 913' for receiving a scent stick or other attractant 914. Additionally noted is a removable and replaceable leg member 901 joinable with a pin member 208, as shown.

In this manner it will be appreciated that the features discussed above may be readily adapted to a variety of alternative lure shapes without departing from the scope and spirit of the present invention.

Figure 29:
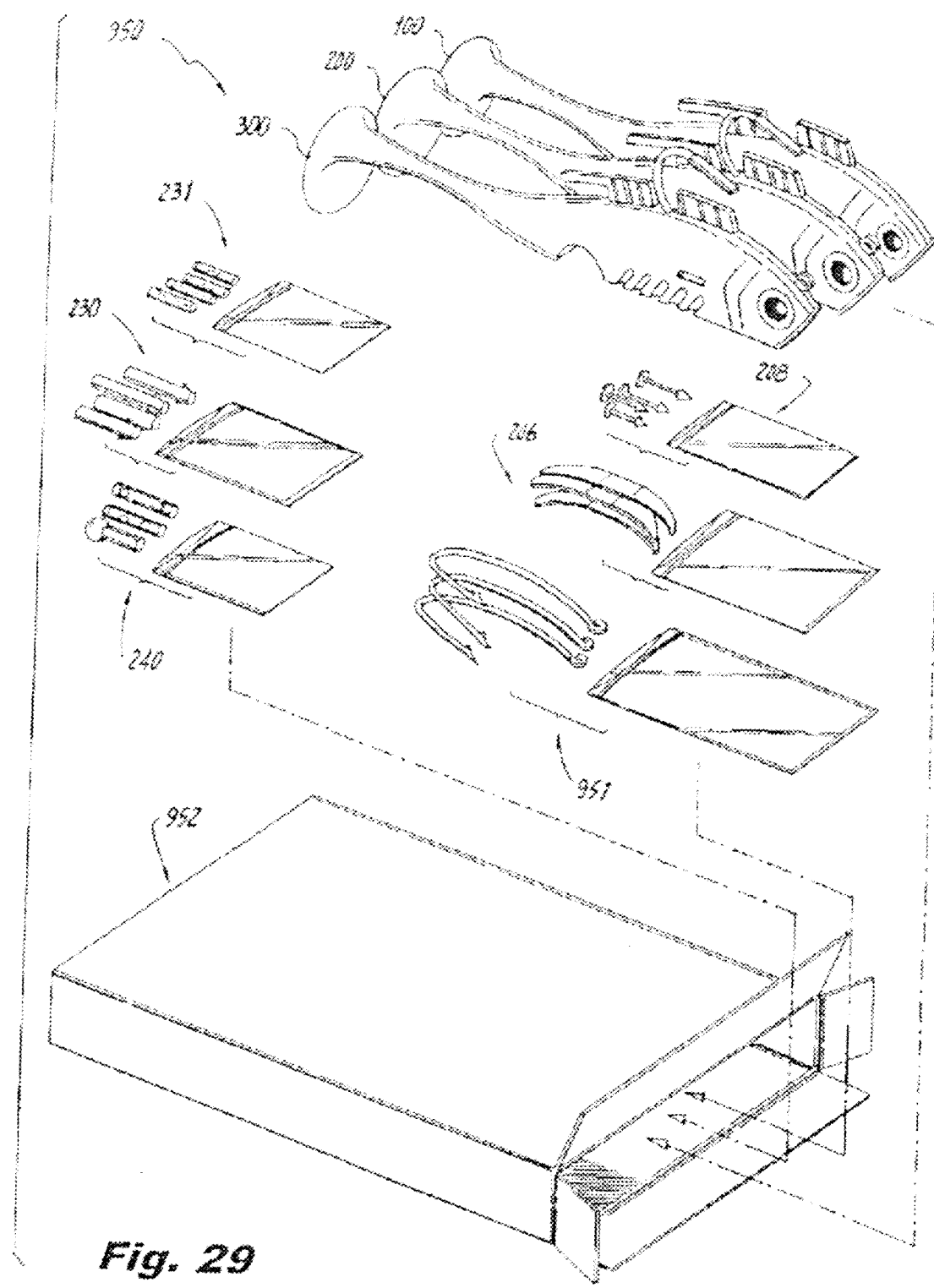
FIG. 29 is an exploded perspective view of a kit assembly according to one embodiment of the present invention, wherein a plurality of hooked and un-pre-hooked lures are provided in combination with spare hooks, weights, locking pins, attractant sticks, replacement fins, and other elements as noted herein.

Referring now to FIG. 29, a kit assembly is provided as embodiment 950 containing a variety of lure bodies 100, 200, 300, a variety of hook members separately packaged 951, a variety of locking pin members 208, a plurality of scent stick members 231, a plurality of weights 230, a plurality of sound attractant systems 240, and a plurality of fin members 206 all packaged in a box member 952 for ready transport and storage. As will be appreciated by one of skill in the art having studied the attendant kit and assembly 950 the interchangeable features provided may be employed to appeal to any of the five senses of the prey fish (sight, sound, feel, taste, and smell) to provide a five-senses lure to a user.

Figures 38, 38A:
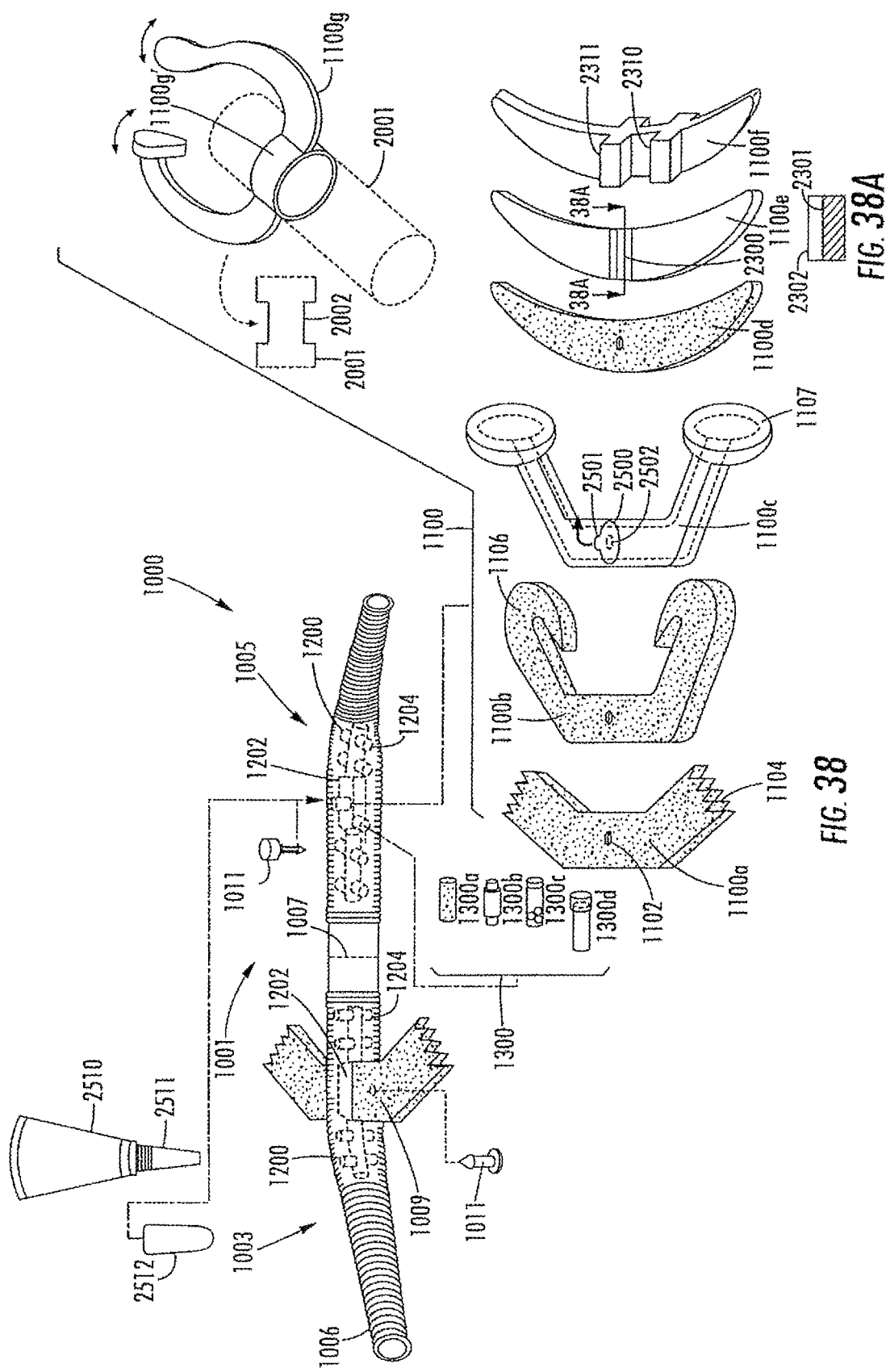
FIG. 38 is a perspective view of an embodiment of a flexible lure system including a flexible lure and various attachable arm and pin members and attractant members.
FIG. 38A is a partial sectional view through fin or leg 1100e noting the recessed portion for securely engaging with a fin receiving opening on a lure body.
Figure 39:
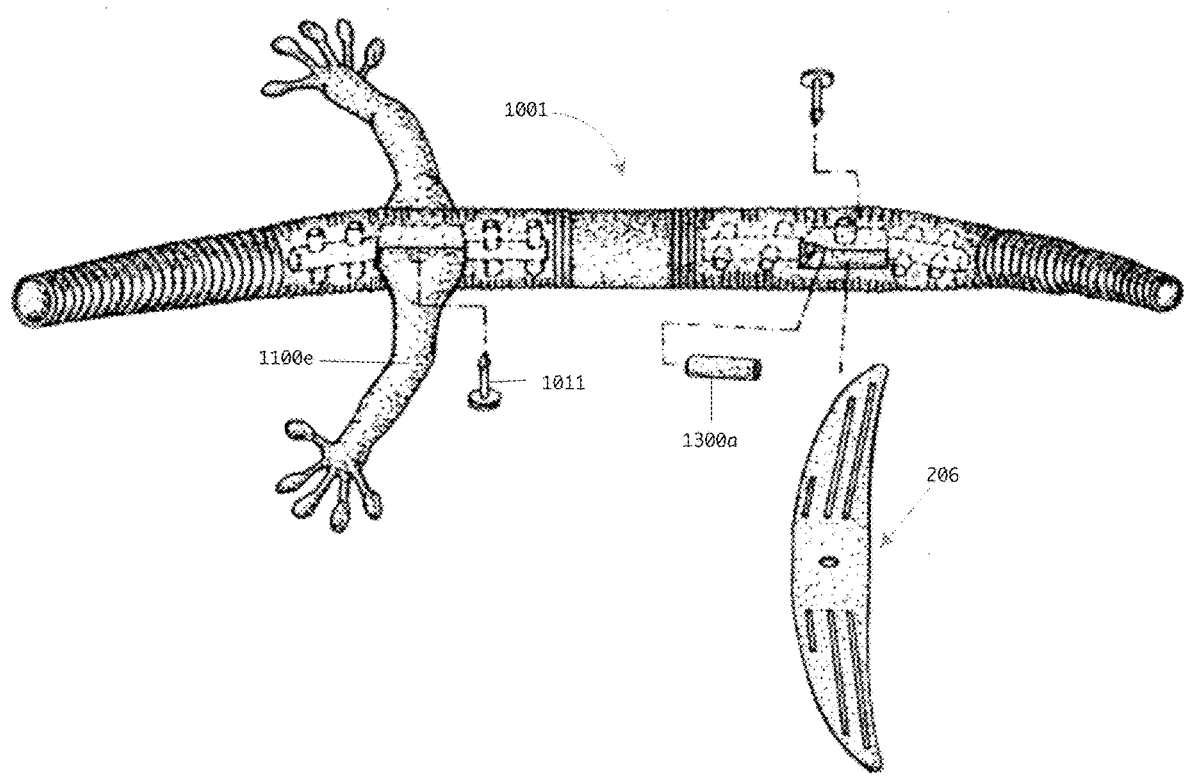
FIG. 39 is a perspective view of a further embodiment of a flexible lure system including a flexible lure and various attachable arm and pin members.

Referring generally now to FIGS. 38, 38A, and 39, a flexible lure system 1000 is provided. The kit system 1000 may include a lure body 1001. The lure body 1001 may be formed from any suitable material such as, for example, a flexible polymer (e.g., silicone). The lure body 1001 may have a generally worm-like shape, as discussed earlier, or may have any other type lure shape disclosed herein (fish, worm, frog, crayfish, crab, leach etc. or a combination thereof for example a worm+tail combination) within the scope of lure shapes. That is the lure body 1001 may be generally cylindrical in shape. In this particular embodiment, the lure 1001 may also include a plurality of ribs or rib-like grooves 1006 along the length of the groove. The grooves 1006 may facilitate the mouth-feel of a natural worm and may additionally aid the wobbling of the lure to wobble and/or aid bending, sinking, rising, diving, and motion etc. as the lure moves, which simulate a more life-like movement of the lure to enhance game-fish strikes on the lure.

The lure body 1001 may be divisible into a left part 1003 and a right part 1005 either as constructed or by a user upon initial use. A weakening line or visual indicator 1007 may be provided as a series of indentations formed in the circumference of the lure body 1001, and may be positioned substantially at the center of the lure body 1001 to aid in dividing (e.g., by cutting or tearing) the lure body 1001 into two generally equally sized parts 1003, 1005. The lure body 1001 may be generally symmetrical with respect to the visual indicator 1007 (e.g., a dashed line cut into the surface of the body 1001), which may extend around the circumference of the lure body 1001.

Each of the parts 1003, 1005 of the lure body 1001 may include a receptacle 1009 that is configured for receiving a locking pin 1011 therein via an opening (shown but not numbered). Optionally, a locking pin 1011 may be substantially similar to the previously described locking pin 208 and may include various friction enhancing features to facilitate securing the pin within the receptacle 1009 of the lure body 1001. Additionally, it is noted that a locking pin 1011 may be excluded for fin-retainment in the fin slot shown and instead, fin or feet members 1100 may be coupled or secured to the lure body 1001 at the receptacle 1009 via the pin 208 by aligning the one or more positioning holes 1102 of the structure 1100 with the receptacle 1009 and inserting the pin 1011 therethrough.

Additionally, it is now realized that select fin and foot 1100 shapes may include recessed or raised profiles or gripping profiles (to be discussed) that secure fin or foot or flipper or claw 1100 shapes within slot 1009 without need for a locking pin 1011 of any kind. Additionally, (as noted below) fin or foot 1100 shapes may be provided with a peel-and-expose adhesive patch (as shown) such that the adhesive may be exposed prior to insertion into slot 1009 and then press-glued to the interior of slot 1009 of lure 1001 to secure the fin/foot 1100 without the need for a pin. Furthermore, openings 1200 and the pin locking holes (if provided) that provide a flow access to the inner chambers 1204 (discussed below) may receive via a glue tube/glue bottle (shown later) for a user to insert a glue application to further seal fin and foot 1100 shapes (of any kind) to any of the herein discussed lure systems.

Members 1100 may have a variety of shapes and configurations to mimic or approximate a life-like appearance and for engaging with a lure 1001 or optionally a lure 1002 (as partially shown, top right in FIG. 38). For example, the structures may include leg/fin structures 1100*a-g*. The member 1100*a* may resemble an animal's legs or feet and may include finger-like protrusions 1104 on one or both opposing sides of the member 1100*a*. The member 1100*b* may include two generally opposing hooks or wriggly fins 1106 that may resemble fins/feet that are curling to appear as if in a swimming motion and to provide motion during cast/retrieval. The member 1100c may include one or two generally opposing feet 1107 which may be oriented in different positions such that the feet 1107 appear to be in a paddling motion. As will be optionally noted, here, on member 1100c a peel-and-expose adhesive member 2500 includes a pull tab cover 2501 covering an adhesive surface 2502 that would allow member 1100c to adhesively be secured within slot 1009 without the need for a locking pin. In this manner, the adhesive system functions also as a locking member or locking system to secure the member 1100c to any lure body. It will be understood that adhesive member 2500 may be readily adapted to any of the fin-leg examples in the application within the skill of those in the art of lure design. As will also be understood an alternative adhesive system 2510 in the form of a small bottle of glue or acetone (which functions to glue silicone members together) having a tip member 2511 for dispensing and a cap 2512 to secure the tip between uses. In an optional locking arrangement, it will be understood that adhesive system 2510 may be provided in a combined kit form with lure 1000 and the features herein for sale jointly packaged. Additionally, during a use, it will be understood that following securing of any of the fin-members 1100 to any body 1001, 2001 or otherwise in this application, a user may dispense adhesive into the fin-receiving slot or into any of the openings 209 to secure respective members 1001, 1300 or otherwise to the lure body without departing from the scope and spirit of the present invention.

The member 1100d may have a generally crescent shape and may resemble fins extending from the lateral sides of the lure 1001 when coupled thereto. Other structures 1100 mimicking animal-like characteristics are within the scope and spirit of the present disclosure. As shown in FIG. 39, a structure 1100e including frog-like arms may be coupled to the lure body 1001 in a similar manner as described above with reference to structures 100a-d. The previously described fin 206 may also be coupled to the lure body 1001 in the same manner as described in connection with the members 1100. It will be noted that while the members 1100 are shown including a locking-pin hole centrally 1102, there is no need for this in view of (i) alternative means for retaining the fins 1100 within the fin receiving opening by friction fit, adhesive, physical engaging structures or otherwise.

A further member 1100e is provided having a general shape as shown but additionally including a resistance profile 2300 in the form of a central narrowing or recess or channel 2301 having a lip 2302 on either side thereof. Similarly, a member 1100f is formed with a resistance profile 2310 at a mid-point having extending side members 2311 that extend upwardly from the surface of member 1100f to provide the resistance provide. During a use, of either member 1100e or 1100f, a user may pull the member through the receiving opening into the lure 1001 or otherwise so that the resistance profiles 2300, 2310 form an interference fit with the receiving opening (e.g., engaging the recess channel 2301 or side members 2311) to lock the member within the receiving opening. In this manner these structures form means for lockablly and releasably securing members within the opening without a need for a locking pin. It will also be understood, that these proposed structures, and any proposed structures herein may be inter-changed in construction and design without departing from the scope and spirit of the present invention.

A further alternative member 1100g is formed as a resistance band or portion 1100g' having one or more extending fin or leg members as shown. Alternative member 1100g is constructed for passing around or over a lure member 2001, which optionally includes a reduced profile portion 2002 about an outer periphery thereof. As can be seen in an upper portion of FIG. 38, alternative member 1100g may be slidingly-placed over a lure member 2001 for securement. This alternative construction allows optional replaceable receiving means in addition to those constructions noted herein and without departing from the scope and spirit of the present invention.

The lure body 1001 or 2001 may include one or more chambers 1200, which may extend through the lure body 1001 along an axis aligned with a diameter of the lure body 1001 or at any desired angle thereto depending upon the formation of the lure body. The chambers 1200 may be configured to snuggly receive a variety of shaped cartridges or sticks 1300, which may provide various stimulants (e.g., sound, light, smell, weight, float, rattle, etc.) to attract fish and to change and modify the lure-action of the lure (wriggling, lifting, floating, sinking etc.), therein. A further window or slot 1202 may provide an additional access point to a additional and optional longitudinally extending channel 1204 within the lure body 1001 along a length thereof. The slot 1202 may be formed along a lateral side of the lure body 1001 and may extend therethrough. The slot 1202 may be generally rectangular. The chambers 1200 may be accessed via the slot 1202 or the slot at the other side of lure 1000 such as slot 1202 and the lure body 1001 may be manipulated, e.g., bent and/or stretched, to facilitate desired placement of a cartridge or stick 1300 within an appropriate chamber 1200 by inserting the stick 1300 into the slot through the channel 1204 until being placed within a desired chamber 1202. The stick 1300 may be manipulated to be positioned within the channel 1204 or may be manipulated to be placed within one of the chambers 1200. When the stick 1300 is positioned within the channel 1204, since the chambers 1200 are open to the surface of the lure body 1001, the stimulants (such as scent, sound, light) may still be emitted via the chambers 1200 to the environment. Additionally, as noted use of adhesive such as adhesive 2510 may be squirted within the openings to secure members 1300 within chambers 1202.

The cartridges or sticks 1300 may include various sticks providing different attractants and/or stimulants that may appeal to any of the senses of a fish including, for example, sight, sound, feel, taste, weight, float and/or smell. The sticks may include sticks 1300a-e. Stick 1300a may provide or dispense a scent or a smell. For example, a fluid may be within the stick 1300a that may be released when a fish or the like bites into the stick 1300a. Stick 1300b may either be a float (foam float) or a weight to weigh down the lure body 1001 and to provide a unique erratic swimming action by weighing down a particular area or segment of the lure body 1001 so that the body 1001 appears to be naturally wriggling as a worm (e.g., with a weight proximate the centers and a float on either end of the internal channels so that the worm ends undulate while sinking post-casting. Stick 1300c may be similar to sound generating member 240 and include freely moving elements therein, which can generate a rattle when the stick 1300c is moved. Stick 1300d may include a light. For example, the stick 1300d may include a light emitting diode (LED) and/or may be formed from a photoluminescent material (such that it would glow in the dark) or provide a prey-stimulant light.

As will be appreciated by those of skill in the art having studied the included disclosure that the lure body while preferably flexible, may easily include each of the features in a substantially rigid or rigid body with adaptations to accommodate the same. As noted one embodiment included a rigid head member, and where a rigid body member were included the weights, scent sticks, colors, weights and floats and other items insertable in the passages would still operate on a friction fit function but would now engage the rigid sides of the passages with the spike members or rubber fingers or by mere friction itself so as to ensure a similar operation.

As used in the claims the outer surface of the lure, the periphery shape is the premetral or outer shape not bound to any particular specific shape (fish, crab, shrimp, frog, leach, crayfish, worm, etc.) and refers broadly to the existence of the shape but not a particular shape.

Similarly, it will be appreciated that a bite mark or recess type 16 that passes from side to side of a lure may be applied to a non-fish shape (for example the crab and other non-fish-shape lures in the text, but also spoon type baits (rigid bent sheets of curved solid material) known to be of a type to those of skill in the art. As a result, it will be appreciated that each of the above features may be applied to a variety of lures within the scope and spirit of the present invention.

For example, it will be also appreciated that while embodiment 100 did not include a hook, the same may be provided in a kit or an assembly provided to the public with the other features as discussed herein without departing from the scope and spirit of the present invention.

Additionally, in regard to a kit or an assembly package, nothing herein shall so limit the kit or assembly embodiment to those features shown. It will be understood that additional items may be included in the kit without departing from the scope and spirit of the present invention, for example, additional fishing line, other lures, mechanical or electronic noise or sound generating systems.

It will be additionally appreciated by those of skill in the art that the phrases system or assembly may be used interchangeably based on the context without departing from the scope of the present invention and without limiting the particular claim or discussion. For example, a sound generating system or a sound generating assembly will be recognized as including at least one of the sound creating (audible vibration creating (in air or water)) items noted herein. Similarly, the fact that fish will both scent and taste the compounds and in the 'scent' sticks is to be interpreted as limiting. It will be understood that some compounds may be 'smelled' and some may be 'tasted' by a fish and some may be both 'smelled' and 'tasted' without departing from the scope of the present discussion.

As will additionally be understood by those of skill in the art, the phrase 'flexible' or 'adaptive' when used to describe the lure system itself will be understood similarly to mean a lure system wherein a number of functions and options maybe inter-used or optionally employed according to the desire of a user. For example a flexible lure system includes many options as would an adaptive lure system.

Whereas the phrase 'flexible' when used to discuss the body of a lure itself refers to a characteristic of the body—namely being flexible or bendable itself. As a consequence, those of skill in the art will appreciate that a flexible lure system may have either a rigid lure body, a flexible lure body or a jointly assembled flexible and rigid body (as in FIGS. 14-14B) without departing from the scope and spirit of the present invention.

It will additionally be understood by those of skill in the art that the use of the phrase fin member in the claims will be broadly interpreted to include shapes that represent fins on a fish-type lure, but may also include replacement limbs or to other members of a non-fish type lure (for example a replacement claw-leg in a crab-type lure or a replacement leg in a frog-type lure).

It will also be understood by those of skill in the art that the phrases bite mark or bite shape will be adequately represented by the phrases semi-cylindraceous or semi-cylindrical without departing from the scope and spirit of the present invention.

In the claims, means- or step-plus-function clauses are intended to cover the structures described or suggested herein as performing the recited function and not only structural equivalents but also equivalent structures. Thus, for example, although a nail, a screw, and a bolt may not be structural equivalents in that a nail relies on friction between a wooden part and a cylindrical surface, a screw's helical surface positively engages the wooden part, and a bolt's head and nut compress opposite sides of a wooden part, in the environment of fastening wooden parts, a nail, a screw, and a bolt may be readily understood by those skilled in the art as equivalent structures.

Having described at least one of the preferred embodiments of the present invention with reference to the accompanying drawings, it is to be understood that the invention is not limited to those precise embodiments, and that various changes, modifications, and adaptations may be effected therein by one skilled in the art without departing from the scope or spirit of the invention as defined in the appended claims.

What is claimed is:

1. An adaptable fishing lure system, comprising:
a fishing lure body having an elongate shape;
at least one defined chamber formed and extending within at least a portion of the fishing lure body and having at least a first external access opening relative to said fishing lure body;
said at least one defined chamber being configured to removably receive an insertable attractant so as to provide an attraction during a use thereof;
at least one insertable attractant being selected from a group consisting of: a scent releasing attractant, a sound emitting attractant, a reflectant visual attractant, a light emitting attractant, a bubble-generating attractant, a dissolvable attractant, and a weight attractant;
a replacement member replaceably attachable to the fishing lure body; and
at least one means for replaceably receiving and securing the replacement member with said fishing lure body and for projecting the replacement member from said fishing lure body.

2. The system, of claim 1, further comprising:
said replacement member being selected from a group containing: a limb member, a leg member, a claw-member, a fin, a curled tail, flexible tail member, and a paddle-tail.

3. The system of claim 1, further comprising:
a plurality of said defined chambers in said said fishing lure body operable to receive respective ones of a respective plurality of said insertable attractants during said use.

4. The system of claim 2, wherein:
said replacement member further comprises:
at least one replacement member defined chamber extending within at least a portion of the replacement member and having an access opening relative to said replacement member;

at least one replacement member insertable attractant being operably configurable to provide an attraction during said use thereof; and at least one replacement member insertable attractant being selected from a group consisting of: a scent releasing attractant, a sound emitting attractant, a reflectant visual attractant, a light emitting attractant, a bubble-generating attractant, a dissolvable attractant, and a weight attractant.

5. The system, of claim 1, wherein:

said insertable attractant further comprises an engagement profile for engaging with an inner wall of said defined channel; and said engagement profile engaging with said lure during a securement therewith to prevent an unintended separation of said insertable attractant during said use.

* * * * *